United States Patent [19]

Abe et al.

[11] 4,328,556
[45] May 4, 1982

[54] CONTROL SYSTEM OF PLANTS BY MEANS OF ELECTRONIC COMPUTERS

[75] Inventors: Masao Abe, Chofu; Haruo Kawahara, Fuchu; Yoichiro Kogure, Tama; Masahiro Maeohmichi, Musashimurayama; Tetsuo Takeuchi, Kamakura; Norihiko Karashima, Toride, all of Japan

[73] Assignees: Tokyo Denryoku Kabushiki Kaisha; Tokyo Shibaura Denki Kabushiki Kaisha, both of Japan; part interest to each

[21] Appl. No.: 30,528

[22] Filed: Apr. 16, 1979

Related U.S. Application Data

[63] Continuation-in-part of Ser. No. 610,852, Sep. 9, 1975, abandoned.

[51] Int. Cl.³ .................. G06F 15/46; G05B 19/00
[52] U.S. Cl. ................................ 364/900; 364/492; 364/172
[58] Field of Search ... 364/200 MS File, 900 MS File, 364/492, 493, 494, 495, 105, 107, 108, 111

[56] References Cited

U.S. PATENT DOCUMENTS

| | | | |
|---|---|---|---|
| 3,400,374 | 9/1968 | Schumann | 364/200 |
| 3,555,251 | 1/1971 | Shauit | 364/900 |
| 3,581,289 | 5/1971 | Wilhelm et al. | 364/200 |
| 3,582,901 | 6/1971 | Cochrane et al. | 364/200 |
| 3,585,603 | 6/1971 | Ross et al. | 364/900 |
| 3,701,113 | 10/1972 | Chace et al. | 364/200 |
| 3,702,989 | 11/1972 | Provenzano, Jr. et al. | 364/200 |
| 3,741,246 | 6/1973 | Braytenbah | 364/900 X |
| 3,778,780 | 12/1973 | Moore | 364/200 |
| 3,821,526 | 6/1974 | Anderson | 364/900 |
| 3,846,760 | 11/1974 | Ironside | 364/900 |
| 3,881,172 | 4/1975 | Bartlett et al. | 364/200 |
| 3,959,636 | 5/1976 | Johnson et al. | 364/200 X |
| 4,001,785 | 1/1977 | Miyazaki et al. | 364/900 |
| 4,035,624 | 7/1977 | Lardi | 364/494 |

OTHER PUBLICATIONS

"TOSBAC-7000/25 SYSTEM MANUAL", Tokyo Shibaura Electric Co., Ltd.
"COPOS Supervisory Monitor and Control System", Toshiba-Tokyo Shibaura Electric Co., Ltd., 1976.

*Primary Examiner*—Gareth D. Shaw
*Assistant Examiner*—Thomas M. Heckler
*Attorney, Agent, or Firm*—Stevens, Davis, Miller & Mosher

[57] ABSTRACT

In a system of controlling the operation of a plant by using a digital computer, operation control procedures are classified according to various states of the plant process variables. The control procedures comprise essential break points of the plant running, and process controlling operations, process supervision operations, information display operations and other processings related to the Tables corresponding to the operation control procedures are prepared containing classified items which are described according to a predetermined format. The contents of the tables are converted into machine words and stored in the memory device of the computer. The computer is provided with means responsive to a changed process signal from the plant for selecting a table corresponding to the changed process signal (representing a changed state) to form an operating signal which is used to control the plant. There is also provided means for displaying and modifying the content of a selected table. This permits ready modification or addition to the tables by the computer itself.

6 Claims, 24 Drawing Figures

FIG. 6a

PLANT CONDITION DISCRIMINATION TABLE

| PMS NAME | TURNING CLUTCH DISENGAGE | | | | | | | | | | | |
|---|---|---|---|---|---|---|---|---|---|---|---|---|
| PMS NO. | PMS 001 | ACTION NO. | | | | | | | | | | |
| INTERLOCK CONDITION | INL | | | | | | | | | | | |
| STD CONDITION TERMS | | | | | | | | | | | | |

| | | 1 | 2 | 3 | 4 | 5 | 6 | 7 | 8 | 9 | 10 | 11 | 12 |
|---|---|---|---|---|---|---|---|---|---|---|---|---|---|
| CONDITION NAME | DEAD BAND | PID SYS NO. OR TP NO. | LIMIT VALUE NO. OF ANALOGUE INPUT | ABOVE/ON/SET | UNDER/OFF/RESET | BAD INPUT HOLD (1) | REFERENCE (1) | HOLD (1) | PREVIOUS CONDITION | COMPLETION CONDITION | TRIGGER BYPASS NECESSARY OR NOT (I/O) | LOGIC (AND/OR/$\overline{AND}$) | ANSWER INTERMEDIATE RESULT TPi |
| 1 TURBINE SPEED > 50RPM | | T264 | 0 | 1 | 0 | 0 | 0 | 0 | 0 | 0 | 1 | AND | ANS |
| 2 TURNING CLUTCH DISENGAGE | | T450 | 0 | 1 | 0 | 0 | 0 | 0 | 0 | 0 | 1 | AND | = |
| 3 TURBINE MASTER RESET | | T300 | | 1 | 1 | 1 | 1 | 1 | 0 | 0 | 0 | | |
| 4 | | | | | | | | | | | | | |
| 5 | | | | | | | | | | | | | |

FIG. 6b

PLANT CONDITION DISCRIMINATION TABLE

FIG. 7

| MCS NAME | | | | | | | | |
|---|---|---|---|---|---|---|---|---|
| MCS NO. | ACTION NO. | | | | | | | |
| MCS 001 | INL | | | | | | | 16 |

| CONDITION NAME | PID. PMS. SYS NO | LIMIT VALUE NO. | ABOVE ON SET (1) / UNDER OFF RESET (0) | | | | |
|---|---|---|---|---|---|---|---|
| | | | 1 | 2 | 3 | 4 | |
| 1 TURNING CLUTCH DISENGAGE | PMS001 | | 0 | 0 | 0 | 1 | |
| 2 SPEED > 400 RPM | T264 | 01 | 0 | 1 | 1 | | |
| 3 TURBINE SPEED UP PBON | T301 | | 1 | | | | |
| 4 | | | | | | | |
| 39 | | | MIN.ACCEL-ERATION | MIN.ACCEL-ERATION | | | |
| 40 | | | 0B00 | 0B00 | | | |

| MAIN STEAM STOP VALVE BYPASS VALVE CONTROL | | | | | | | | |
|---|---|---|---|---|---|---|---|---|
| SUPERVISORY CONDITION AFTER STARTING | | | | | ALG 0001 | ALG 0001 | | |

| BKR | |
|---|---|
| EXT | |

FIG. 8a

| OPERATION NAME | | MINIMUM ACCELERATION | | | | | | | | | | | | | | |
|---|---|---|---|---|---|---|---|---|---|---|---|---|---|---|---|---|
| OPERATION TABLE NO. | ACTION NO. | SYSTEM NAME | CUSTOMERS | | MODE | | | | | | | | | | | |
| OB 00 | | T.B | C | S | M | | | | | | | | | | | |
| INTERLOCK CONDITION | | MCS TABLE NO. | | | | | | | | | | | | | | |
| INL | | MCS 001 | | | | | | | | | | | | | | |

STD CONDITION TERMS

| | | 1 | 2 | 3 | 4 | 5 | 6 | 7 | 8 | 9 | 10 | 11 | 12 | 3 |
|---|---|---|---|---|---|---|---|---|---|---|---|---|---|---|
| | CONDITION NAME | PID SYS NO. OR TP NO. | ANALOGUE INPUT LIMIT VALUE NO. OF | ABOVE/ON/SET | UNDER/OFF/RESET | BAD INPUT HOLD (1) | REFERENCE (1) | HOLD (1) | PREVIOUS CONDITION | COMPLETION CONDITION | TRIGGER BYPASS NECESSARY OR NOT (1/0) | LOGIC (AND/OR) | ANSWER TRANS(TIMING CONDITION) CANS(COMPLETION CONDITION) PANS(PREVIOUS CONDITION) OTHERS: TP | DURING OPERATION BAD PREVIOUS CONDITION OCCURS |
| | | | | | | | | | IGNORE CONDITION | | | | | |
| | | | | | | | | | WHETHER UNSATISFACTORY MESSAGE IS NECESSARY OR NOT | | | | | |
| X | | | | | | | | | | | | | | |
| Y | | | | | | | | | | | | | | |
| 1 | TURNING CLUTCH DISENGAGE | PMS001 | | | | 0 | 0 | 0 | 0 | 0 | 1 | AND | CANS | 3 |
| 2 | SPEED > 400 RPM | T264 | 01 | 1 | 0 | 0 | 0 | 0 | 0 | 0 | 1 | " | " | |
| 3 | MISMATCH TEMP. > -111°C | T270 | 00 | 1 | 0 | 0 | 0 | 0 | 0 | 0 | 1 | AND | AND | |
| 4 | MISMATCH TEMP. < 167°C | T270 | 01 | 0 | 1 | 0 | 0 | 0 | 0 | 0 | 1 | " | PANS | |
| 5 | | | | | | | | | | | | | | |

FIG.9a

| SUPERVISORY GROUP NAME | | CONDITION TO BE SUPERVISED AFTER STARTING | | | | | | | | | | | |
|---|---|---|---|---|---|---|---|---|---|---|---|---|---|
| ALG NO. | ACTION NO. | | | | | | | | | | | | |
| ALG 001 | | | | | | | | | | | | | |
| INTERLOCK CONDITION | SUPERVISORY MCS TABLE NO. | CONDITION | | | | | | | | | | | |
| INL | MCS 001 | | | | | | | | | | | | |
| STD | | CONDITION TERMS | | | | | | | | | | | |
| | | CONDITION NAME | PID SYS NO. OR TP NO. | LIMIT VALUE NO. OF ANALOGUE INPUT | ABOVE/ON/SET | UNDER/OFF/RESET | BAD INPUT HOLD (1) | REFERENCE (1) | HOLD (1) IGNORE | | TRIGGER BYPASS NECESSARY OR NOT (1/0) | LOGIC OR/AND | ANSWER INTERMEDIATE RESULT TPi |
| | | | 1 | 2 | 3 | 4 | 5 | 6 | 7 | 8 | 9 | 10 | 11 | 12 |
| | | X | | | | | | | | | | | | |
| | | 1 | | | | | | | | O | O | — | | |
| | | 2 | | | | | | | | O | O | — | | |
| | | 3 | | | | | | | | O | O | — | | |
| | | 4 | | | | | | | | O | O | — | | |
| | | 5 | | | | | | | | O | O | — | | |

FIG.9b

| INPUT NAME | WHEN HOLD PROCESS (%) | PID NO. | LIMIT VALUE NO. OF ANALOGUE INPUT | ANALOGUE | | | CONTACT | | | ANALOGUE INPUT | | |
|---|---|---|---|---|---|---|---|---|---|---|---|---|
| | | | | CHECK COMMENCE (1) | CHECK STOP (1) | KEY INSERT (1) | ALARM WHEN ON | ALARM WHEN OFF | SUPERVISION STOP | LIMIT VALUE | UNIT | UPPER LIMIT / LOWER LIMIT (U/L) |
| 1 MAIN STOP VALVE TEMP. DIFFERENCE BETWEEN INNER AND OUTER SURFACES | — | T204 | 00 | — | | | | | | VAL | °C | U |
| 2 FIRST STAGE TEMP. DIFFERENCE BETWEEN INNER AND OUTER SURFACES | — | T205 | 00 | — | | | | | | VAL | °C | U |
| 3 TEMP. DIFFERENCE BETWEEN BEARING RETURN OIL AND FEED OIL #1 | — | T227 | 00 | — | | | | | | 28 | °C | U |
| 4 TEMP. DIFFERENCE BETWEEN BEARING RETURN OIL AND FEED OIL #2 | — | T228 | 00 | — | | | | | | 28 | °C | U |

FIG.9c

| | | | | | | |
|---|---|---|---|---|---|---|
| 5 | ADJUSTING VALVE NOT FULL OPEN | 1 T338 | | | | |
| 6 | CONDENSER VACUUM | 1 T030 0 0 | | | 670 mmHG L | |
| 7 | MAIN STOP VALVE FIRST STAGE TEMP. DIFFERENCE BETWEEN INNER AND OUTER SURFACES | 0 T204 0 0 | — | | | |
| 8 | TEMP. DIFFERENCE BETWEEN INNER AND OUTER SURFACES | 0 T205 0 0 | — | — | | |
| 9 | TEMP. DIFFERENCE BETWEEN BEARING RETURN OIL AND FEED OIL #1 | 0 T227 0 0 | — | — | | |
| 10 | TEMP. DIFFERENCE BETWEEN BEARING RETURN OIL AND FEED OIL #2 | 0 T228 0 0 | — | — | | |
| 11 | ADJUSTING VALVE NOT FULL OPEN | 0 T338 | | — | | |
| 12 | CONDENSER VACUUM | 0 T030 0 0 | | — | 99999 | |
| 21 | | | | | | |

BKR
TRG
EXT

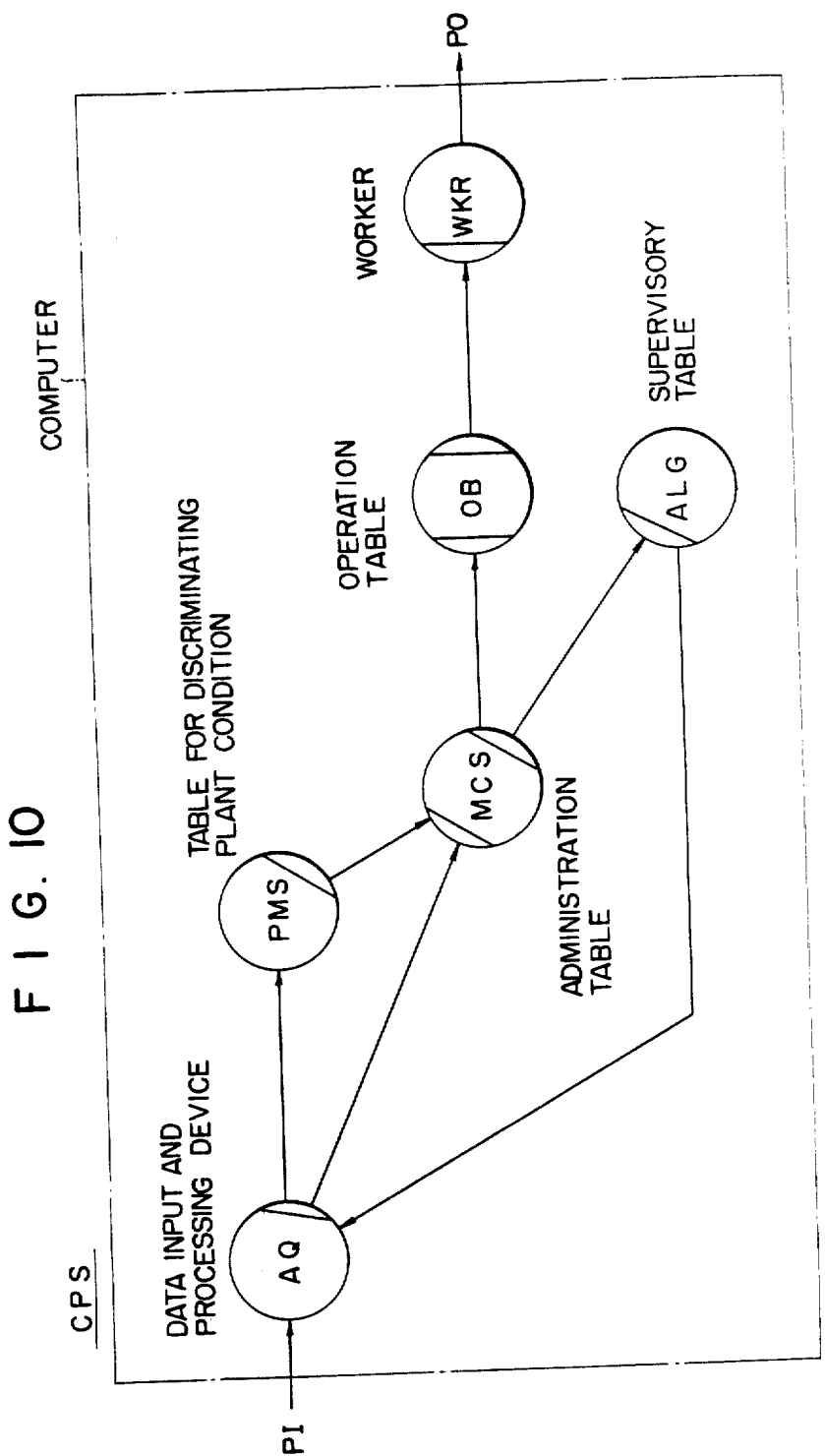

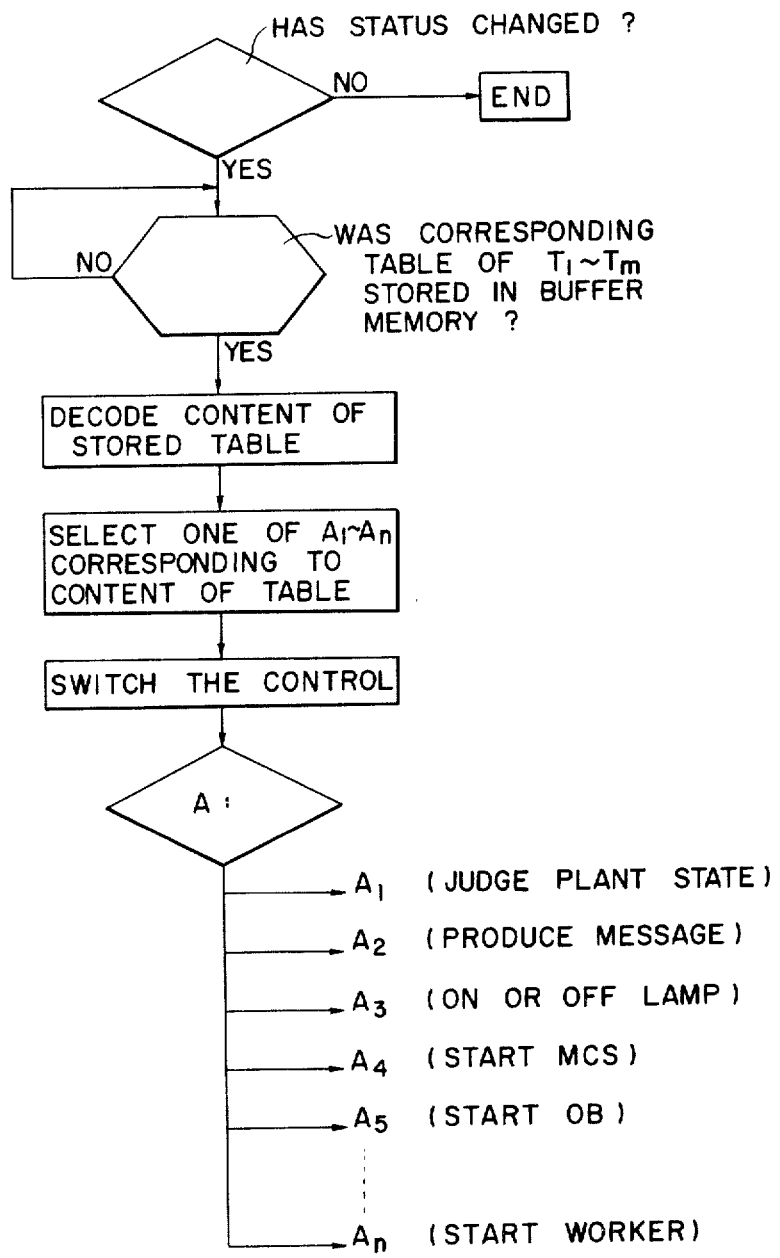

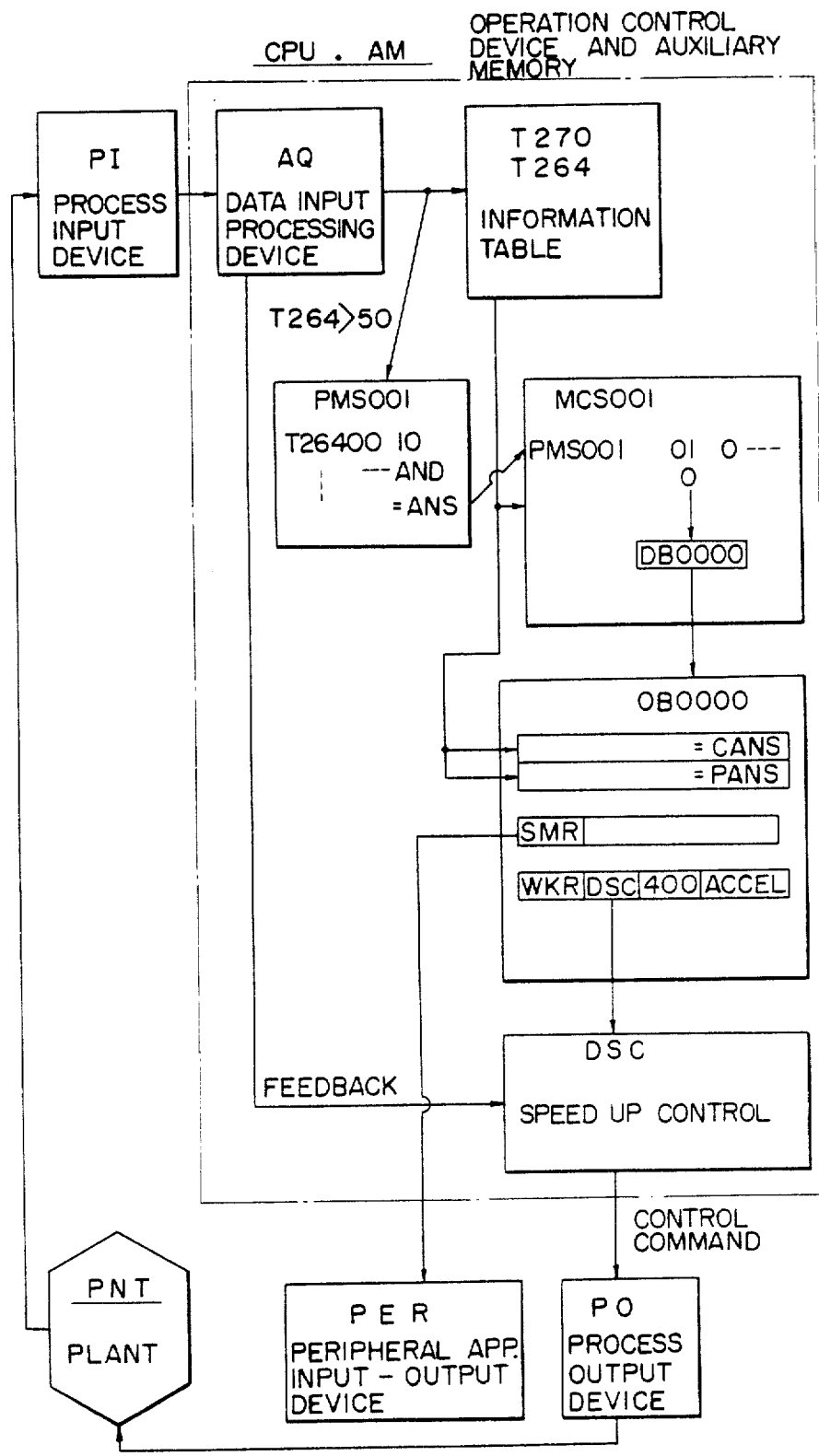

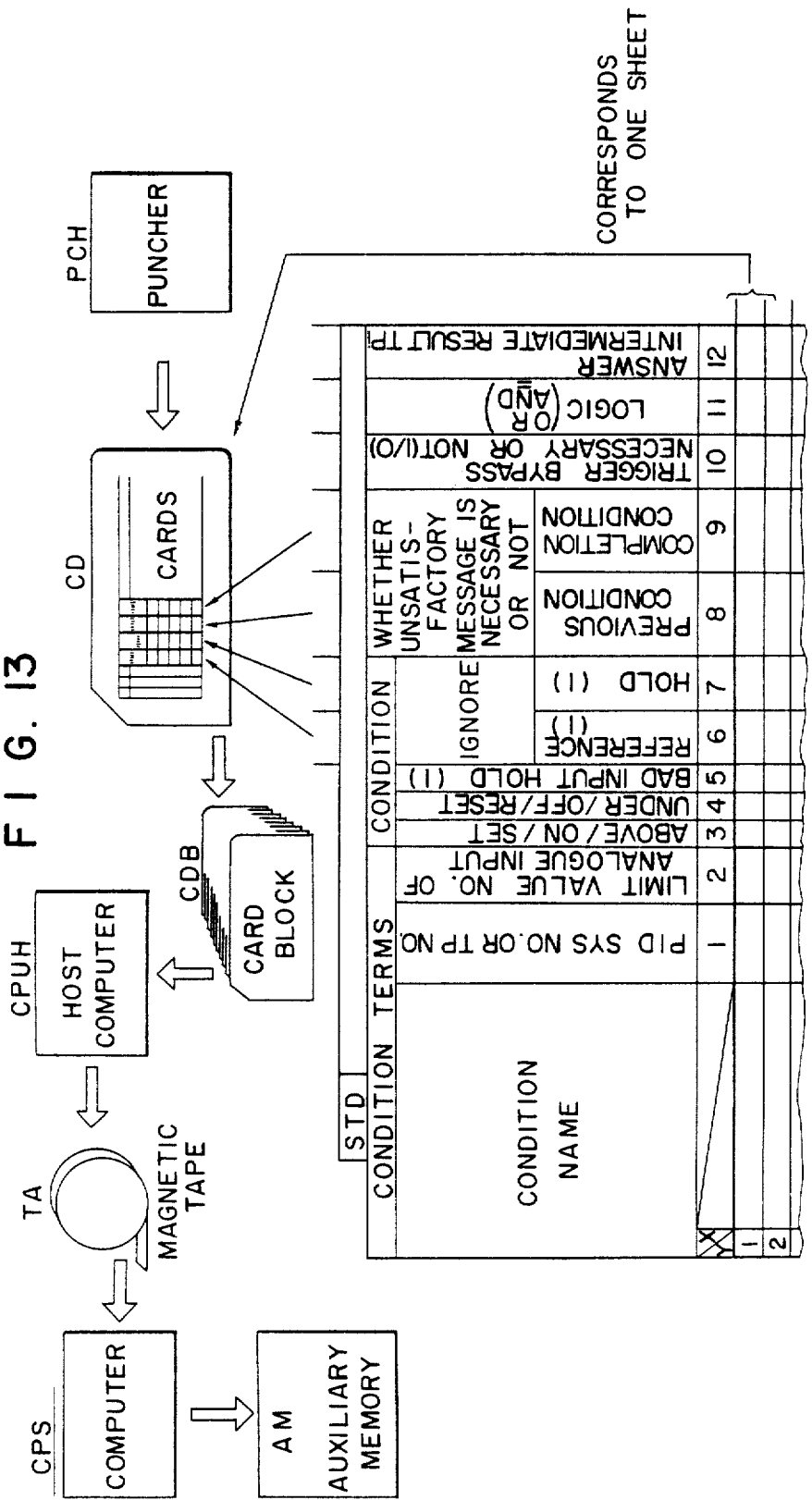

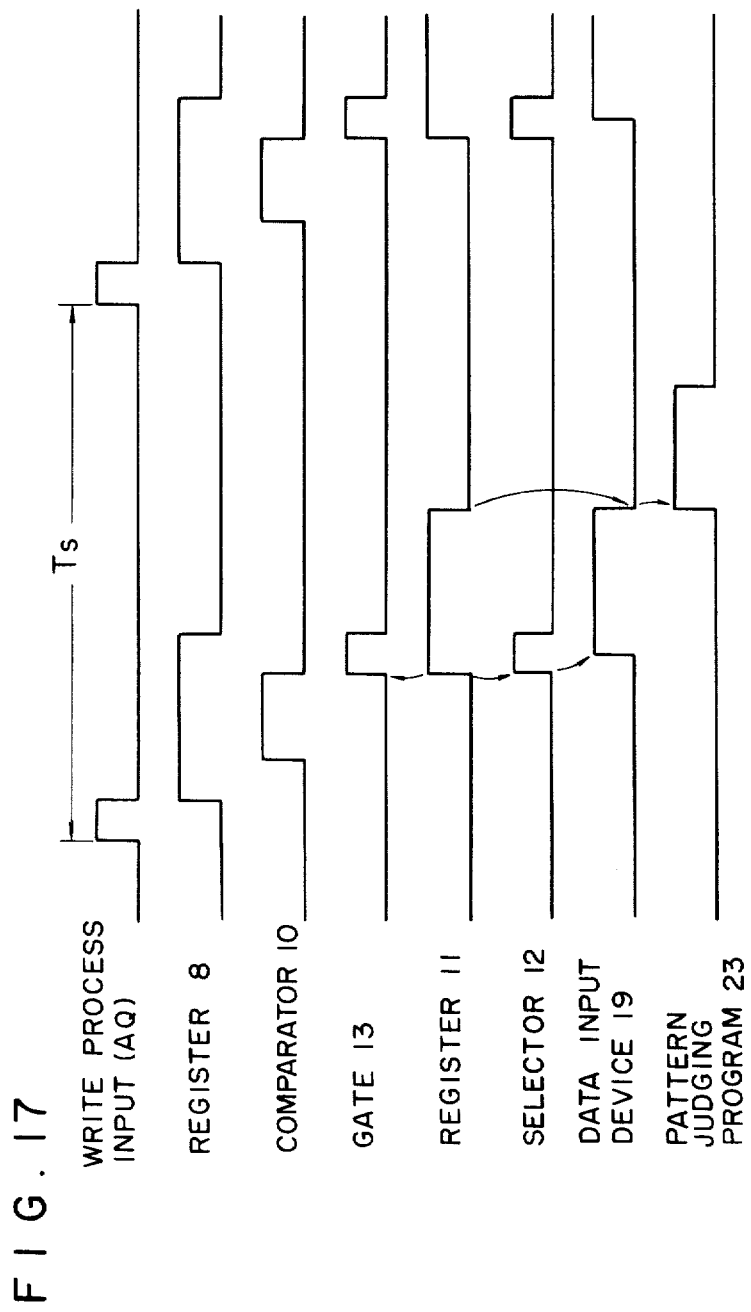

CONTROL SYSTEM OF PLANTS BY MEANS OF ELECTRONIC COMPUTERS

CROSS-REFERENCE TO RELATED APPLICATION

This application is a continuation in part of our prior application Ser. No. 610852, abandoned, filed Sept. 9, 1975, entitled METHOD AND SYSTEM OF CONTROLLING PLANTS, and now abandoned.

BACKGROUND OF THE INVENTION

This invention relates to a system of controlling the operation, display and or supervision of various plants, more particularly to a system of automatic operation of plants wherein the preparation and changing of programs for automatically operating plants by an electronic digital computer system are made easy.

The invention is especially suitable for automatic operation of plants of a large scale. As one typical example, the invention will hereinafter be described as applied to the automatic operation of a steam electric power generating plant, but it should be understood that the invention is equally applicable to a hydroelectric power generating plant, an atomic energy electric power generating plant, or a chemical industrial plant and many other plants. With recent development of electronic digital computer systems (hereinafter merely termed computer), computers have been used for the automatic operation of plants for the operation and supervision thereof, and the fields of automatic operation are broadened year after year.

A steam electric generating plant (hereinafter merely termed plant) generally comprises such main machines and apparatus as a boiler, steam turbine, generator, transformers and circuit breakers and many other auxiliary machines and apparatus. In order to maintain the plant at the best operating condition it is necessary to vary the operating conditions of various component elements of the plant in accordance with their characteristics and operating standards to meet the varying operating conditions of the plant. For this reason, in order to operate a steam electric generating plant at high efficiencies it is necessary to predetermine the operating procedures of the component elements based on their characteristics and operating standards in accordance with varying operating conditions of the plant. To manually operate the plant, the operator usually judges what operation should be made according to an operation instruction book and the condition of the plant at that time.

Prior art methods of automatically controlling plants are classified into (1) a sub-loop control, (2) a wired logic or sequence control and (3) a computer control which are outlined as follows.

(1) Sub-loop control

This control is performed by analogue control apparatus and essentially consisting of a constant value control or a program control. But according to this control, the control is not switched to the optimum control by observing general operating conditions of the plant and the controls of the main and auxiliary machines are not coordinated.

(2) Wired logic or sequence control

This control is applied to a small group of control among the overall control of a plant, for example, control of "furnace purge" or "fuel warming" of a steam electric power plant. These controls are not in the form of feedback controls, (closed loop controls) but consist of a mere combination of one operation and time elapsed. Accordingly, the operator is required to judge that at what time the controls of sub-systems of such small group should be made during the entire control of the plant.

(3) Computer control

According to this control, a plant is controlled by a computer and this control not only can be substituted for the sub-loop control and wired logic or sequence control described above but also can take over the judgment of the operator at the time of manual operation. Furthermore, this control is applicable to non-linear type controls, which are difficult to control, of the sub-loop control of the closed loop type for the purpose of improving the control characteristic thereof.

Since each component element of a plant requires a proper control which is not only appropriate for the element but also well coordinated with the overall control of the plant when it is desired to perform overall automatic operation of the plant by a computer, it is necessary to prepare control systems separately for respective elements and to form a program for operating the computer.

In order to apply a computer to the automatic operation of a plant, the following should be considered.

(1) The temperature, pressure, flow quantity, voltage, current and other factors of respective elements or portions are to be detected to determine the operating condition of the plant.

For example, during the starting stage of the plant there are many predetermined status changes including completion of ignition of the boiler, completion of warming up of the turbine in which the temperature and speed of the turbine are gradually increased by admitting steam into the turbine and completion of the connection in which the generator is connected to an electric power system by closing a circuit breaker. The status of various devices of a plant is herein termed the "plant master status (P.M.S.) of the plant".

(2) Then, it is necessary to determine the detail of the next operation by determining the changes of these P.M.S., that is the present condition of the plant.

The operations required to be performed during the period between the ignition and the warming up include increase in the temperature and pressure of the boiler, warming of the turbine valves, and bringing the turbine control valve to the starting (open) position, etc.

(3) Considering a specific operation of the plant control, it can be noted that the operation follows a single pattern of operations or steps to be performed.

(a) To this end, it is necessary to check whether a machine to be controlled is in an operable condition or not, or whether the machine has already been allowed to operate or not before the desired control is performed. In this description this check is termed "condition check before operation".

(b) When the condition of item (a) is satisfied the operation of the control circuit or apparatus is commenced.

(c) Then a check is made whether the operation of item (b) is normal or not and whether the operation has been completed or not. This check is termed "condition check after completion of the operation".

Describing the above described operation pattern for the starting of a steam turbine, it can be analyzed as follows:

A. The condition check before operation.
1. The check to determine whether the turbine mismatch temperature is within prescribed limits or not.
2. The check to determine whether the expansion and differential expansion of the turbine are normal or not.
3. The check to determine whether the "speed up button" mounted on an automatic operation board has been depressed or not.

B. Operation.
1. The target rotating speed of the turbine is set to 400 R.P.M. and the rate of acceleration is set to a value ($R_{AC}$) selected by the predetermined running schedule for the start of the turbine.
2. The control is commenced and the speed of the turbine is increased to 400 R.P.M. at a rate of acceleration of $R_{AC}$.
3. A message is displayed by a typewriter or on a display unit such as a cathode ray tube (CRT) display unit to inform an operator of the start of the turbine.

C. The condition check after completion of the operation.
1. Whether the turning clutch between a starting motor and the turbine shaft has disengaged or not is checked.
2. Whether the turbine speed has increased to 400 R.P.M. or not is checked.

(4) Further, in the automatic operation of a steam turbine various supervisory and correction operations are necessary.

For example, when the speed of the turbine is in a critical speed range (for example 800 to 2100 R.P.M.) and the vibration of the turbine bearing exceeds a permissible limit, it is necessary to promptly decrease the turbine speed to a safe value (for example 800 R.P.M.).

Summarizing the above, an automatic processing of a plant under control of a computer requires the following procedures.
1. It is necessary to operate the plant according to predetermined procedures and rules.
2. When the conditions of the plant which are not directly controlled during running or the conditions of the plant occurring as a result of such control become abnormal it is necessary to correct such abnormal conditions.
3. Supervision or timing necessary for the descrimination of such conditions are judged.

To perform these procedures by a computer, it is necessary to prepare programs for this purpose, but as above described since the plant is made up of a number of machines and apparatus having different characteristics and since it is necessary to operate them while maintaining appropriate coordination between their characteristics and the operating conditions of the plant, it is extremely difficult to standardize the program utilized to the automatic operation of the plant. Moreover, since the program is different for different plants, it is necessary to modify the standard program to meet specific specifications of the customer. However, as the type of the plant varies greatly and the capacity thereof continuously increases preparing the program requires much labour and time as described below.

FIG. 1 is a diagram showing a prior art procedure for preparing a program used in the automatic control of a plant, in which 1 designates a table showing measuring points and contains input signals, ranges, methods of measurement, alarm set points, etc., block 2 shows an automatic control device including a flow diagram of the starting and running operation and operating sequences, and 3 a specification of supervisory functions, 11, 21 and 31 respectively show the preparation of flow charts and coding operations regarding the table 1 of the measuring points, the starting and running operations of (block 2) and the specification of supervisory functions (block 3). 12, 22 and 32 show converters for converting the codes into machine words by means of host computers or debugging computers. 4 represents a debugging computer which completes a final program by adjusting the outputs of 12, 22 and 32. Block 5 represents a modification operation of the program in terms of the machine words, in which minor modifications of the program are done by the debugging computer 4 as shown by arrow 51 whereas extensive modifications are made before converting the codes into machine words as shown by arrow 52. Such modifications require much labour. Moreover, the preparation of flow charts and the coding operations at 11, 21 and 31 become voluminous as the capacity of the plant increases.

As described hereinabove, to prepare a program for the automatic operation of the plant, it is necessary to firstly prepare block diagrams and then detailed flow charts. FIG. 2 shows one example of a block diagram utilized to accelerate a turbine, in which RQR means "wait until conditions are satisfied" and ASU means "commencement of supervision". The steps of accelerating the turbine are as follows.

1. A push button that commands speed up of the turbine is not yet depressed. Under these conditions, a lamp contained in the push button is caused to flicker by the computer until the push button is depressed by an operator.
2. The acceleration of the turbine is commenced by setting the target accelerated speed to 400 R.P.M. and the rate of acceleration to $R_{AC}$.
3. "Acceleration" and "target speed 400 RPM" signals are produced as the message outputs by a typewriter or CRT display device.
4. The supervision of the control values of the plant variables, for example G63, T62, etc., is commenced, where these symbols are abbreviations of conditions to be supervised.
5. Disengagement of the turning clutch is confirmed.
6. The fact that the turbine speed has increased to 400 RPM is confirmed.
7. A message "turbine speed 400 RPM" is printed out on the typewriter or displayed on the CRT display unit. Thus, it is necessary to predetermine the running schedule by preparing a block diagram for operating the plant in a manner described above. When the block diagram is completed, the desired program is completed by the preparation of the flow chart and the coding operation which are based on the block diagram as has been described with reference to FIG. 1.

However, this method of preparing programs has the following defects.

(a) Whenever the type and operation procedure of a boiler or turbine or the extent of automation varies, it is necessary to prepare new programs starting from the block diagram. Consequently, it is necessary to prepare different programs and perform different debugging (correction of errors of the program) for different plants thus making it difficult to prepare standard programs.

(b) In block diagrams it is easy to describe the flow of operations with time but extremely difficult to describe operations requiring logical judgements. For example, where there are 10 auxiliary machines for one main machine and where 7 of the auxiliary machines are operable automatically, it is extremely difficult to describe the operation of starting at random the seven auxiliary machines.

(c) When the block diagram is completed, a detailed flow chart must be prepared based thereon. However, in such an operation, unless there is sufficient mutual understanding between one engineer who prepares the block diagram and another who prepares the flow chart, errors are inevitable. Moreover, preparation of the flow chart directly from the block diagram requires complicated work and the flow chart cannot be understood by those not skilled in the computer art.

(d) The flow chart and the block diagram are not always identical. Lack of the strictness of the flow chart results in the decrease of the reliability of the automatic running system as well as the non-coincidence between the specification and control system manufactured.

(e) It is difficult to change or modify the program so that where an extensive modification is required, a new program must be prepared.

(f) The preparation of the flow chart and the coding operation require voluminous labour and time.

In spite of these defects, an automatic control system can yet be completed by the prior art method. However, unless the system is actually tested by connecting it to an actual plant there is no assurance that the system will operate as contemplated. For this reason, many modifications of the operations are required during the trial running of the plant. Whenever such modification is to be made it is necessary to return the program to the manufacturing factory. Accordingly, frequent modifications are practically impossible, and, if it must be done, chances for an overall trial run (operation) of the plant may be missed. For this reason, completion of an improved method and system for the automatic operation of plants has been desired for many years.

As described above, use of an electronic computer control is advantageous where it is desired to control the operation of a plant so that it is necessary to prepare programs for the automatic operation which satisfy specific requirements of the plant. Preparation of such programs require voluminous and expensive work including preparation of block diagrams and flow charts based thereon and coding operations.

There has been proposed a so-called "Fill-in the Blank System" for obviating these difficulties. However, this method of preparing tables and the control operations cannot process a plurality of variable inputs, because (a) the sequence of operation is predetermined and not flexible, (b) one output is produced for one input from the plant.

Further, the following additional defects prevent actual use of this system.

(1) So long as the transition of the state of the plant during automatic operation is in a range that can be expected normally there is no serious problem. However, where the state transits to an abnormal state due to an accidental cause or where it is extremely difficult to maintain a synchronism between the plant and its control apparatus at the commencement of the control, the programmed control cannot run normally.

(2) It is difficult to adopt a module structure for the control which is suitable to be processed by the computer.

(3) As the control system of the plant, particularly for an electric generating station for example and especially for the boiler thereof is comprised by a multi-variable control system, the linkages between respective tables are extremely complicated.

(4) As the linkages between the tables are complicated, it requires a long time to modify the tables and to process the control operations by the computer.

SUMMARY OF THE INVENTION

Accordingly, it is an object of this invention to provide a novel system for the automatic operation of a plant wherein the operation control procedures used to operate a plant, which can be divided into a number of combinations of operations to be performed (called patterns), are classified and described in tables in a prescribed manner thereby eliminating troublesome operations required for preparing flow charts from block diagrams and subsequent coding operations.

Another object of this invention is to provide a novel system of controlling the operation of a plant capable of using an inexpensive digital computer.

Another object of this invention is to provide a novel system for the automatic control of a plant wherein modification of or addition to the plant operation control procedures can be made readily by the computer itself.

Still another object of this invention is to provide a novel system of controlling the automatic operation of a plant which can readily correct specification errors or errors in the method of automatic operation.

A further object of this invention is to provide a novel system of controlling the automatic operation of a plant which can follow up at high fidelities any change in the operating state of the plant.

A still further object of this invention is to provide a novel system of controlling the automatic operation of a plant under the control of an electronic computer utilizing tables which are described in logical forms that can be readily converted into machine words for processing in the computer, thereby simplifying the construction of the apparatus. This method of describing the table enables strictly defining the emergency or faulty state of the plant whereby it is possible to continue the operation of the plant.

Another object of this invention is to provide a novel system of controlling the automatic operation of a plant in which the tables and the apparatus for reading and identifying the contents thereof are constructed as independent units so that modification or addition to the operation control procedures can be made by modifying only the tables.

According to this invention there is provided a control system for controlling a plant by means of an electronic digital computer such as a commercially available TOSBAC 7000/25, wherein various operations are performed if conditions calling for a particular operation are satisfied, said control system comprising:

a process input device connected to receive process input signals from said plant, said process input signals respectively representing the process variables of the plant, a data input processing device connected to said process input device for periodically reading the process input signals and judging the status of the process variables of the plant and for producing status signals respectively representing the status of the process variables, an auxiliary memory device for storing operation control procedure tables of a prescribed format, each of said operation control procedure tables containing information as to whether or not the plant is operating in a certain pattern, in relation to the plant operating conditions required for said pattern, said information including a required status of certain of the process variables and further describing operations to be performed when the plant is in a said certain pattern, said operations including process controll operations, process supervision operations and information display operations, said auxiliary memory device further storing worker programs, each associated with each of the process controlling operations and used for performing the associated process controlling operation by producing a control signal for controlling the plant, a first register means connected to said data input processing device for periodically storing one of said status signals, a register means connected through a gate means to said data input processing device for receiving, when said gate means is enabled, one of said status signals and storing the same, the status signal stored in said second register being a status signal previously stored in said first register, comparison means for comparing the contents of said first and second register means, status change memory means responsive to said comparison means for producing an output signal when said comparison means indicates the contents of said first and second register means to not coincide, said gate means being enabled when said status change memory means produces said output signal, a first selector responsive to the output signal of said status change memory means for selecting one or more operation control procedure tables stored in said auxiliary memory device in which the status of the process variable which has been found to have changed is described as one of the conditions for operation, an operation processing device for processing the selected operation control procedure tables in turn, and comprising:

a pattern judging program for judging whether or not the conditions for recognition of a certain pattern are satisfied, and if they are satisfied, judging that the plant is in said certain pattern, and a pattern translating program for translating said certain pattern to determine the operations to be performed when the process is in said certain pattern, said pattern translating program producing, when the operation to be performed is a supervision operation or a display operation, a signal for supervision or display, and producing, when the operation to be performed is a controlling operation, a start command and a transfer command for selecting the worker program associated with the controlling operation, a second selector responsive to said transfer command for selecting the worker program associated with the controlling operation, means started by said start command for reading and translating the worker program selected by said second selector and producing an instruction for control of said plant, and a process output device responsive to the instruction from said instruction means for producing a signal for controlling said plant.

BRIEF DESCRIPTION OF THE DRAWINGS

Further objects and advantages of the invention will become apparent from the following detailed description taken in conjunction with the accompanying drawings in which

FIGS. 6 to 9 show one example of the operation control procedure tables in which FIGS. 6a and 6b, when combined, show a plant condition discrimination table utilized to judge the plant condition;

FIG. 7 shows an administration table;

FIGS. 8a and 8b, when combined, show an operation table;

FIGS. 9a, 9b and 9c, when combined, show a supervisory table;

FIG. 10 is a block diagram showing the outline of the flow of informations and operations;

FIG. 11c is a flow chart showing the operation of the pattern judging program;

FIG. 12 is a block diagram which describes in detail the processing of the automatic operation based on the operation control procedure table;

FIG. 13 is a diagrammatic representation showing the steps of converting an operation control procedure table into machine words;

FIG. 17 is a timing chart showing the operation of various elements shown in FIGS. 11a and 11b.

DESCRIPTION OF THE PREFERRED EMBODIMENTS

Figure 1:
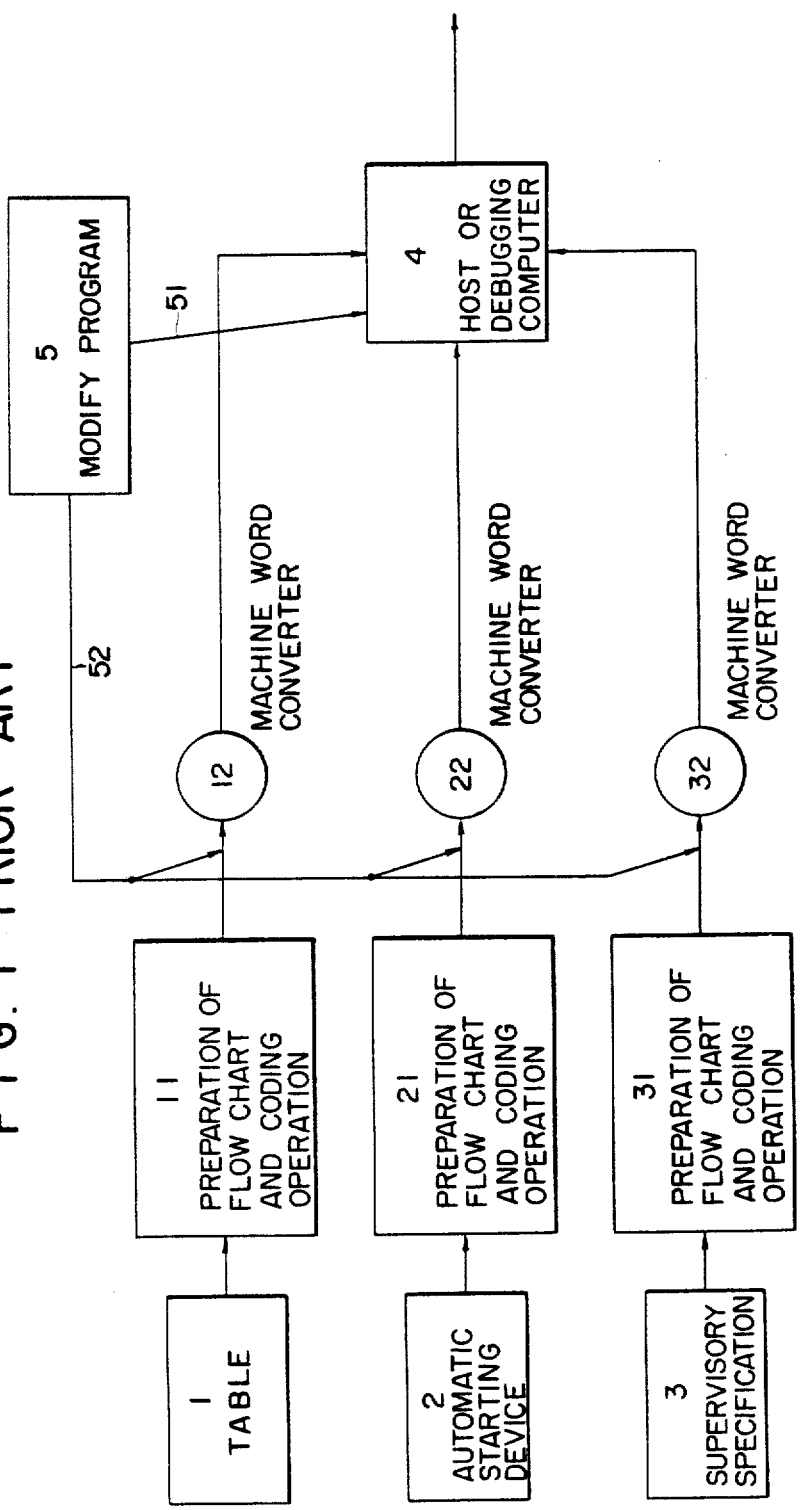
FIG. 1 is a block diagram of a prior art procedure for preparing a program for automatically starting a plant under the control of an electronic computer.
Figure 3:
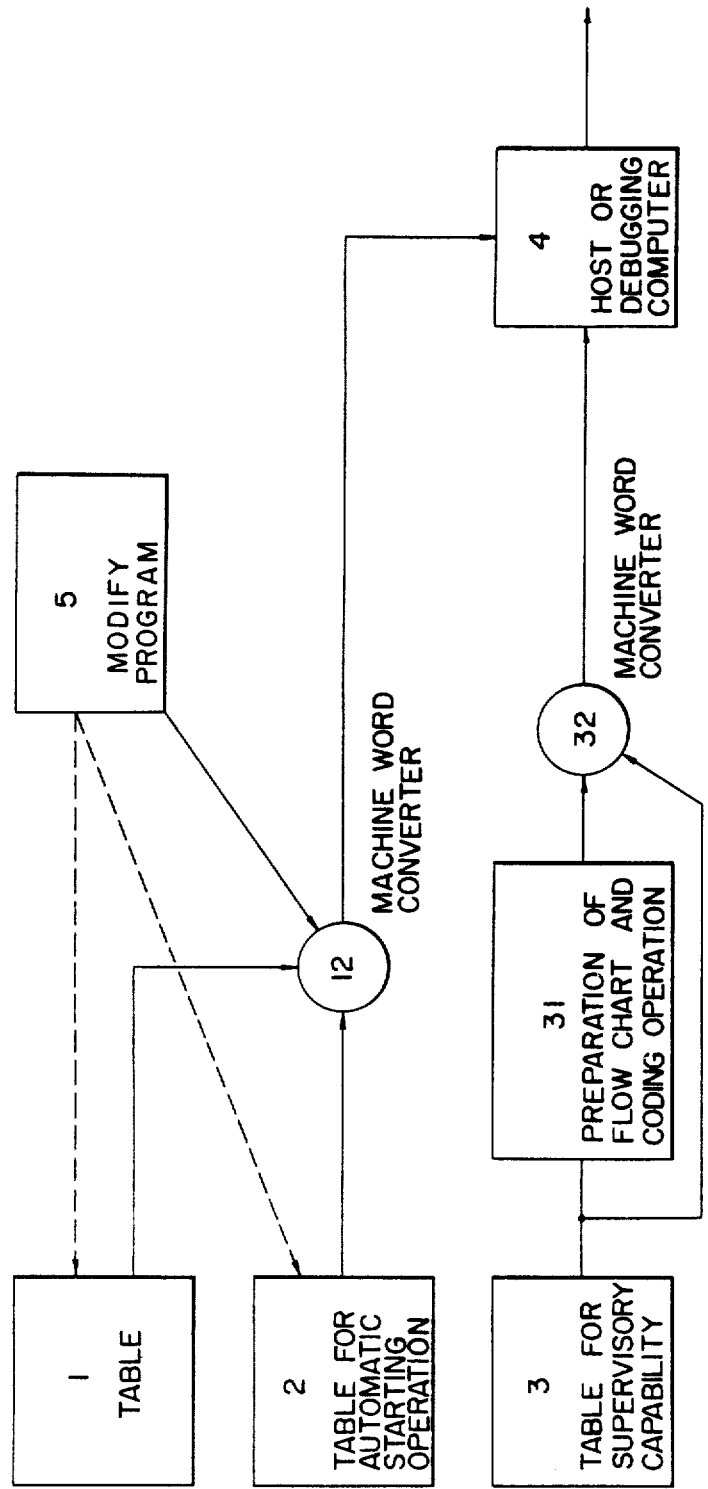
FIG. 3 is a flow diagram showing the procedure of preparing a program according to this invention and utilized to automatically start a plant.

Referring now to the accompanying drawings, FIG. 3 is a block diagram showing a procedure for preparing a program for automatically starting a plant, in which like parts as those shown in FIG. 1 are designated by the same reference numerals. In FIG. 3, 1 shows a table for an automatic starting system and 5 shows a modification program for modifying or adding to the content of the table. The procedure shown in FIG. 3 is different from that shown in FIG. 1 in that signals are directly converted into machine words by a host computer or a debugging computer without the necessity of preparing a flow chart and performing the coding operation shown by 11 and 21. More particularly, according to this invention, for the purpose of eliminating the necessity of preparing the flow chart and performing the coding operation based on table 1 showing the points of measurement of the plant and table 2 showing automatic starting apparatus, as will be described later, a specific format of the description of the card utilized to memorize informations into a computer is adopted to prepare the table and symbols are punched through the card according to that format. Regarding table 2 for the automatic starting operation, the table 2 is described in such format that can be modified by the modification program 5 and the timing for the automatic operation is made to be the same as that described in table 1 showing the points of measurement, that is the signals from the plant which can be processed by logical operations. By using such format of the table it is possible to directly convert the signals into machine words by simultaneously using tables 1 and 2 as the inputs to the host computer or debugging computer. Although the specification of the supervisory function can be processed in the same manner as in the prior art it is possible to save labour by describing informations specific to the automatic operating apparatus in tables 1 and 2. Turning now to the modifying program 5, as will be described later, since the table 1 of the measuring points and the table 2 regarding the automatic starting apparatus are prepared such that each longitudinal line of the table corresponds to one column of a card, that is in a manner easy to prepare a card, it is possible to readily modify in terms of the format that is the card image adopted for tables 1 and 2 instead of in terms of machine words. Furthermore, according to this invention it is possible to prepare a table by reflecting upon the table 1 of the measuring points capabilities required by the specification of table 2 of the automatic starting apparatus and added to input signals concurrently with the preparation of a table of input signals according to the specification regarding the table 1 of the measuring points. Regarding the supervisory capability specification 3 it is possible to construct desired apparatus according to the table data by merely using the standard procedure of using the tables prepared in accordance with tables 1 and 2. Such construction can readily be obtained by using a debugging computer.

Although in the foregoing discription, in view of the efficiency of preparing the program the conversion of the signals into machine words at 12 and 32 was effected by a host computer, where the capacity of a debugging computer is large and where there are a large number of peripheral apparatus it is not necessary to use the host computer. Thus, even when the automatic running apparatus is actually operating it is possible to add or modify the program in a wide range.

Having completed the description of the outline of this invention, a detail of one embodiment of this invention will now be described with reference to FIG. 4 and following drawings.

Figure 4:
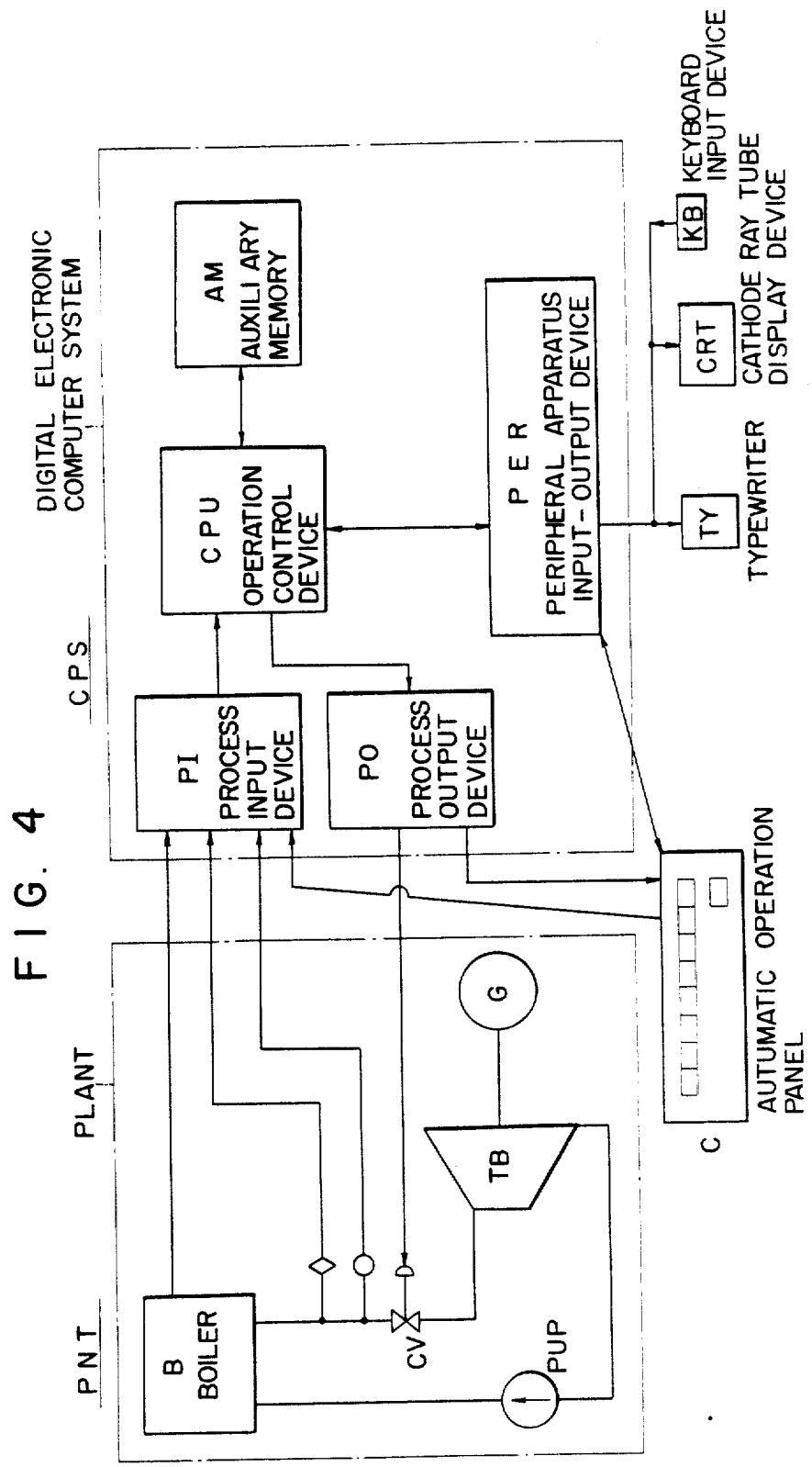
FIG. 4 is a block diagram showing one embodiment of this invention as applied to a steam electric power generating plant.

FIG. 4 is a block diagram showing one embodiment of the plant automatic operating system of this invention as applied to a steam electric power generating plant generally represented by a dot and dash line block PNT and comprising a steam system including a boiler B, a control valve CV, and a steam turbine TB, an electric system including a generator G and a circuit breaker for connecting or synchronizing the generator to an electric power system, not shown, a fuel system of boiler B and many other systems necessary to operate the plant, not shown. Block CPS represents an electronic digital computer system, such as a commercially available TOSBAC 7000/25, for the automatic operation of the plant PNT and includes a process input device PI, a process output device PO, an operation control device CPU, and an auxiliary memory device AM and a peripheral apparatus input-output device PER. There are also provided an automatic operation panel C, a typewriter TY, a display device CRT in the form of a cathode ray tube, and a keyboard input device KB. The computer system CPS comprises an essential element of this invention and signals or informations which respectively represent the process variables necessary for the automatic operation of the plant PNT are applied to the computer from plant PNT or automatic operation panel C through process input device PI and these signals or informations are coded into digital signals which are processed by operation control device CPU and are then sent to plant PNT to act as control signals through process output device PO. Information to the operator is converted into a form that can be directly understandable by the operator through typewriter TY, cathode ray tube CRT or a loudspeaker, not shown.

The following procedure is used for automatically operating the plant by means of a computer. (1) Temperatures, pressures, flow rates, voltages, currents and the like at various components of the plant are detected and used as a basis for determining what operation state of physical state the plant is in. The "operation state" is explained below.

(a) Changes of the state determined by the physical characteristics of the plant, i.e., break points in the operation of the plant are detected. The break points in the operation of a steam power plant include completion of ignition of a boiler, completion of drawing of steam into the turbine, commencement of raising the rotational speed of the turbine, completion of connection or synchronization of the generator with the electric power system of means of a circuit breaker. Each state between break points will be called a plant master status (PMS).

(b) There are a plurality of sub-break points between adjacent break points. For instance, if the magnitude of an analog process variable varies from within a certain range to outside the range, a status of the analog process variable is considered to have changed and a sub-break point is considered to have been passed. An example of such analog process variable is the rotational speed of the turbine. Moreover, when an ON-Off signal indicative of the state of a plant component, e.g., whether a control valve is open or closed, changes its state between ON and OFF, a status is considered to have changed. Furthermore, a system flag (SYS) is used to indicate the "direction" of operation, e.g., whether the plant is in the course of starting the operation or of terminating the operation, or to indicate the history of operation, e.g., whether or not a certain operation is completed, and when the system flag changes a status thereof is considered to have changed. (2) The signals indicative of the plant master status and the signals indicative of the status of the various process variables are used in combination for determining what specific operations are to be performed at each moment. The specific operations are predetermined in relation to the specific combinations of the plant master and process variable status.

For example, the operations to be made during a period after the completion of the ignition and before the drawing of steam into the turbine include increasing boiler temperature, increasing boiler pressure, warming up the valve of the turbine, and positioning the turbine control valve to the start position. (3) It will be understood that each operation consists of a combination of operation steps. This will be described next.

(a) A first step comprises checking whether the particular device is in a condition in which the operation is possible or permitted.

(b) A second step comprises starting control operation by activating a control circuit or device.

(c) A third step comprises checking whether the operation performed by step (b) is properly completed. This step is called an operation completion checking step. (4) Thus, each operation comprises three operation steps. An operation for starting a turbine, for example, comprises the steps as described below.

(a) Pre-operation condition checking step.
 (a-1) Whether the turbine mismatch temperature is within a target value range is checked.
 (a-2) Whether the extension and the extension difference of the turbine are normal is checked.
 (a-3) Whether "rotational speed increase push button switch" on the operation control panel is depressed is checked.
(b) Operation step.
 (b-1) A target rotational speed (400 R.P.M.) and the target acceleration ($R_{AC}$) of the turbine are set.
 (b-2) Control is started. The turbine rotational speed is increased at an acceleration $R_{AC}$ to 400 R.P.M.
 (b-3) A message is displayed.
(c) Operation completion condition checking step.
 (c-1) Whether the turning clutch is disengaged is checked.
 (c-2) Whether the turbine rotational speed has reached 400 R.P.M. is checked.

It will be appreciated from the above-description, that various analog process variables and the status of various devices are chosen as parameters, and the parameters are used in combination as a basis for determining whether or not the particular operation is to be performed. Each combination of parameters can be considered as indicating a state of the plant calling for a particular operation. (5) As the turbine rotation is further increased, the following supervision and correction are necessary.

When the turbine speed is within a dangerous range and the vibration of the turbine shaft is excessive, the turbine speed has to be lowered out of the dangerous range.

Viewed from a different standpoint, automatic operation of a plant by means of a computer involves the following operations.

(1) The plant has to be operated in the order and in accordance with rules predetermined based on the physical characteristics of the plant.

(2) When, during the operation of the plant, an abnormality occurs in the state of the plant which is not directly controlled, a correction has to be made to remove the abnormality.

(3) Supervision for determining the plant states and determination of the time points at which operations and instructions are to be made.

In view of the fact that the overall operation of the plant can be divided into a number of combinations of operations, each of the combinations of operations is, according to the invention, treated as a unit, and is called a pattern. At this juncture, it should be noted that what the terms "operation" and "combination of operations" are relative terms and the term "combination of operations" can mean each of the "operations" or each of the "operation steps" described above. Further, the capability of reading patterns is generalized thus enabling one to freely form any combination of such patterns and a method of describing tables is used to describe the combinations of the patterns.

Figure 5:
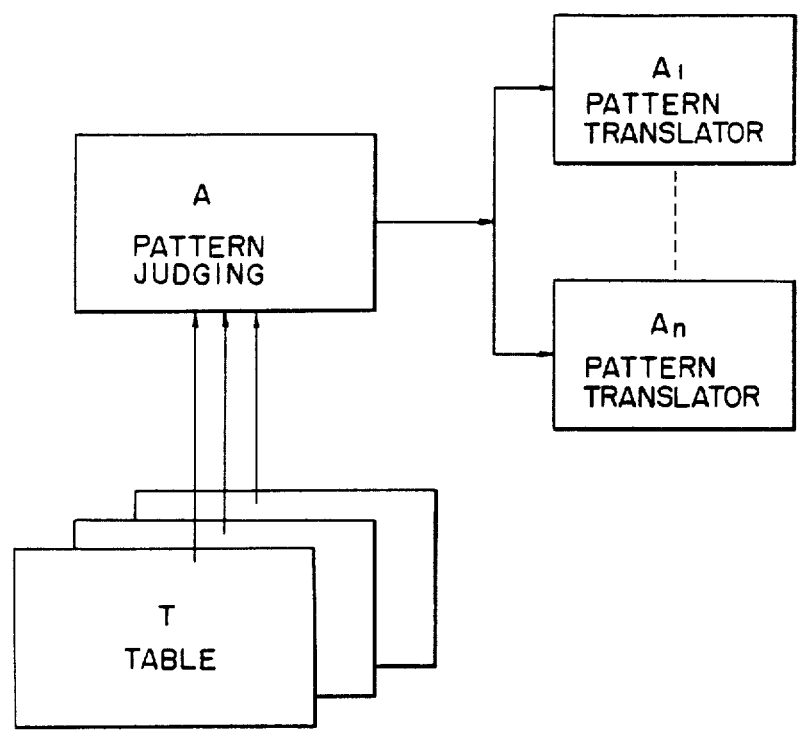
FIG. 5 is a block diagram showing one method of preparing a table utilized in this invention.

FIG. 5 is a block diagram showing the outline of the method of describing a table described above, in which T represents a table for the operation control procedure to be described later and contains a series of operation procedures. The number of tables is equal to the number of unit operations to be performed. The table contains necessary control procedure patterns among $A_1$ through $A_n$ (to be described later) and corresponds to the block diagram and flow chart utilized in the prior art method. The table can be directly processed by an online system. In FIG. 5, A represents the pattern judging capability for selecting a pattern corresponding to the present operating condition of the plant among the patterns described in table T concerning the operation control procedure. $A_1$ through $A_n$ translate and process respective patterns which are described on the table T and selected by A. The result of the processing is used to perform control, display, etc.

An outline of how a table is described has been explained. A further explanation on operation control procedure tables T will now be given.

1. Plant condition discrimination table (PMS)
2. Administration table (MCS)
3. Operation table (OB)
4. Supervisory table (ALG)

Respective tables are described hereunder with reference to the accompanying drawings.

1. Plant condition discrimination table (PMS) (FIGS. 6a, 6b)

This table comprises a combination of plant inputs or plant status information that cannot be processed as the plant inputs, for example, the hysterisis of the rotating speed of the turbine which occurs at the time of rubbing check during acceleration of the turbine, (since it is necessary to temporarily stop the supply of steam for performing rubbing check in which the rubbing between the blades and casing of the turbine is investigated during acceleration, the rotating speed of the turbine decreases temporarily thus causing hysterisis of the rotating speed) and other conditions, thus correctly representing the predetermined operating condition of the plant.

Figure 6B:
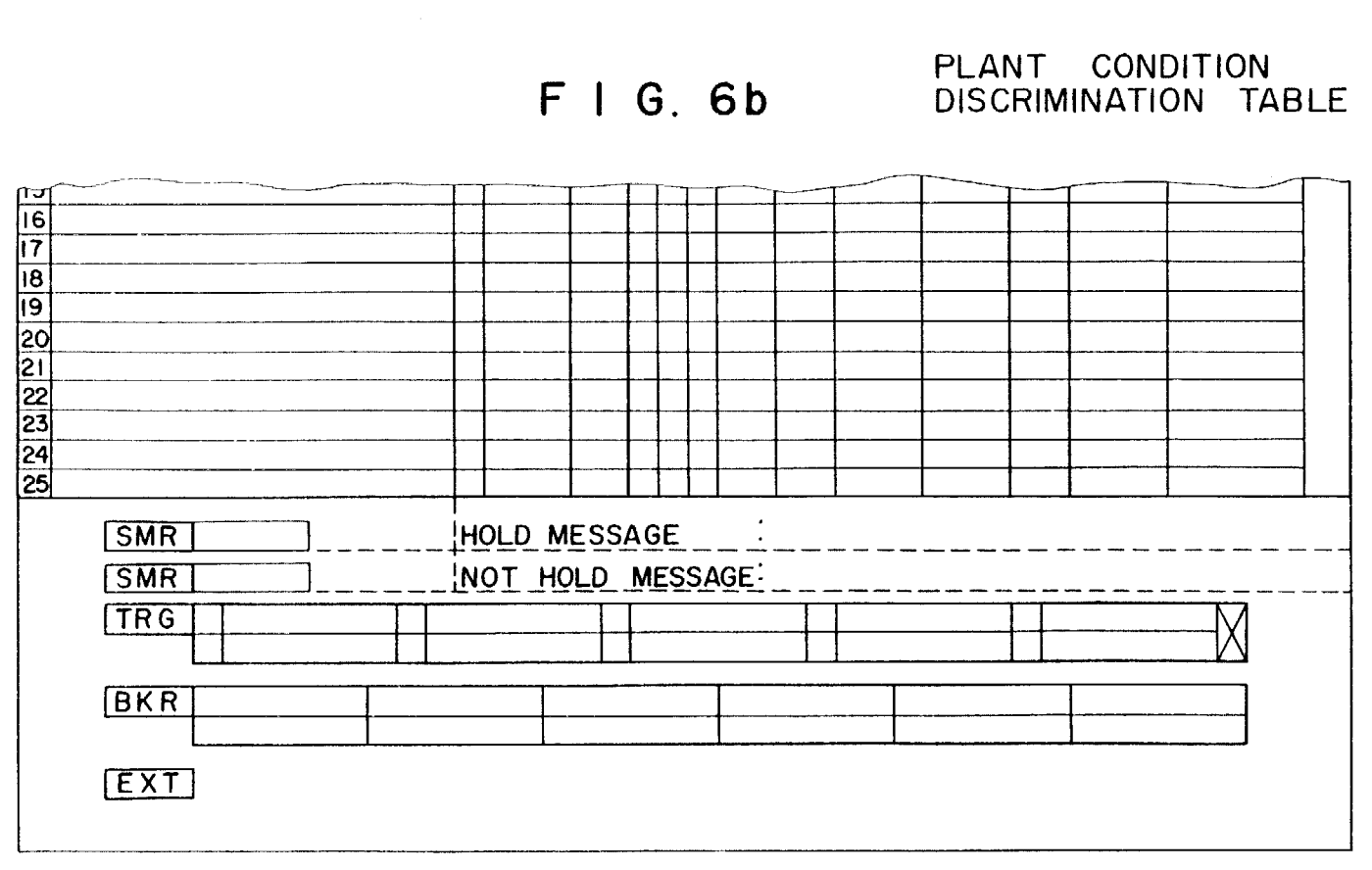

FIGS. 6a and 6b show one example of the plant condition discrimination table (PMS) showing the disengagement of the turning clutch. This table is assigned with a number "PMS001".

The content of this table represents the normal condition of the turbine when the turning clutch thereof is disengaged. The content of this table shows that (a) the rotating speed of the turbine should be higher than 50 RPM, (b) that the clutch should have been disengaged, and (c) that the master trip solenoid of the turbine should have been reset. Symbols T264, etc. represent the inputs which are written into the computer from the plant through the process input device PI, symbols AND and OR are used to represent the type of the logical operations. This example shows that only when all of the conditions (a), (b) and (c) described above are satisfied a condition of said PMS that "turning clutch disengage" is represented.

2. Administration table (MCS) (FIG. 7)

This table describes the timing (a break point for operating the plant) for selection of the operation table (OB) to be described in the following paragraph together with the plant condition discrimination table (PMS) described above and the inputs from the plant. This table also contains the titles of the operation control procedure of respective timings and the plant conditions at those timings.

FIG. 7 shows one example of the administration table showing a portion of the "turbine speed up control". This table is assigned with a number MSC00-1.

The vertical column of this table containing "condition names constitutes an AND condition whereas 1, 2, . . . 16 in the horizontal rows constitute an OR condition. If any one of columns 1 through 16 satisfies all conditions of the vertical column an operation table OB contained in the lower portion of the table described later will be selected. The conditions "satisfy" and "not satisfy" of the item "condition" in the vertical column are denoted by "1" and "0".

More particularly, symbol "1" in horizontal rows of the administration table MCS shown in FIG. 7 means that when all conditions including the turning clutch is not disengaged (0) accordingly "the turning clutch engage" AND, "the rotating speed is less than 400 RPM AND" and, "turbine speed up button ON" are satisfied an operation table "OBOO" described at the bottom and having a meaning of "minimum acceleration" will be selected. Thus, the administration table contains descriptions comprising combinations of vertical columns and horizontal rows.

Figure 8B:
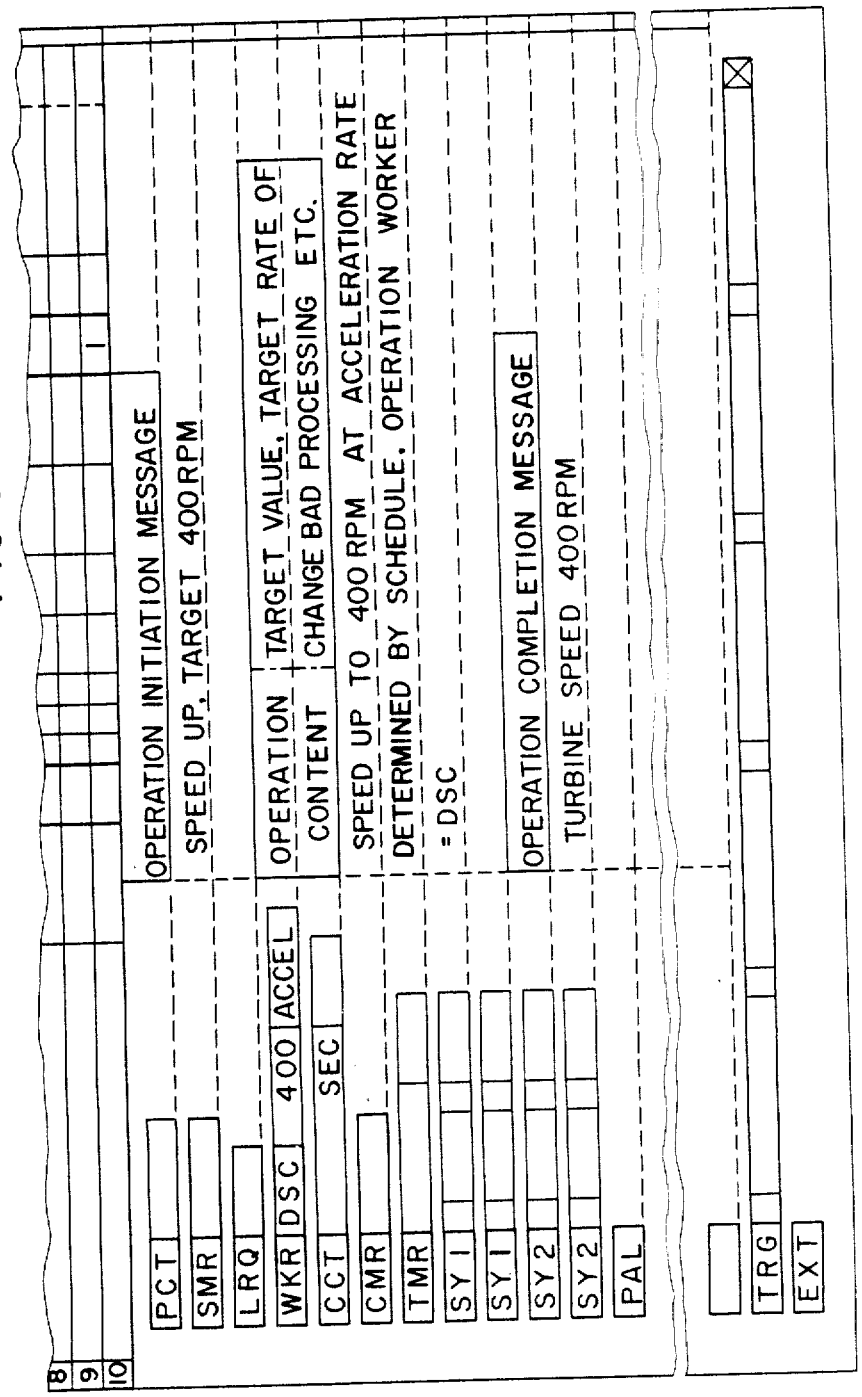

3. Operating table (OB) (FIGS. 8a and 8b)

This table is described in terms of plant status that enable a particular one of a plurality of operations of the plant. As has been pointed out hereinabove, this table is selected from the administration table (MCS).

This table contains the descriptions regarding the following items:
(a) Operating timing condition (those are not described in the administration table MCS)
(b) Condition before operation
(c) Operation completion condition
(d) Title of the operation worker (to be described later) and the target value thereof
(e) Processing to be made when the completion condition is not satisfied
(f) Lighting and turning off of the display lamps on the automatic operating panel
(g) Format of the message FIGS. 8a and 8b show one example of the operation table OB showing the minimum acceleration and assigned with a number "OBOO". This table is constructed by simplified descriptions representing the following operations.

(a) The condition before operation is represented by the fact that the mismatch temperature is in a range of from 111° to 167° C., which is denoted as "PANS".

(b) When the condition before operation of item (a) is satisfied the messages ("SPEED UP" and "TARGET 400 RPM") are printed out on the typewriter of displayed on the CRT display unit for the operator. Then an operation worker "DSC" (to be described later) is selected to accelerate at a rate of acceleration "ACCEL" corresponding to 400 RPM.

(c) The condition after completion of the operation is satisfied when the turning clutch disengages and the speed is increased to 400 RPM and denoted by "CANS".

(d) When the condition after operation completion is satisfied, a message "TURBINE SPEED 400 R.P.M." is produced. Under these conditions all operations described in the operation table OB are completed so that the operation of the operation worker is terminated.

4. Supervisory table (ALG) (FIGS. 9a and 9b)

This table contains groups of process inputs in which the supervisory timings are the same and the processing thereof, for example generation of alarms, are made commonly at the time of supervising the operating condition of the plant. The timing selected for this table may be described therein but usually it is described in the administration table (MCS) shown in FIG. 7 as has been described in item (2).

FIGS. 9a and 9b show one example of the supervisory table ALG containing "conditions to be supervised after starting" of the plant and this table is assigned with a number "ALG001".

This supervisory table ALG means that an alarm is provided when various process inputs described in the column of "INPUT NAME" attain the conditions described therein. The alarm herein means lighting of a lamp in an alarm display window called an "announciater" and an alarm message output. When the condition of the plant departs from the supervised timing, the supervisory operation will be interrupted.

Having completed the description of the operation control procedure table T, the operation worker (WKR) will now be described. The term "worker" is used herein to mean a work controlled drive. The operation worker is a general name of programs which are selectively started by the operation table OB or the supervisory table ALG for directly operating the plant to control various physical quantities of the plant. An ordinary plant is provided with an operating worker WKR having a standard algorithm (control means acting directly upon the plant for controlling the plant to a desired state). These workers are classified into the following three types.

(a) DDC worker (direct digital control worker)

This worker is used to control the turbine speed, for example, and includes operations of directly driving a plant control valve, for example, or the plant by the computer and forming a closed loop through the computer.

(b) Kick action worker

This worker is utilized to control the starting of the fuel pump of the boiler, for example, and involves an operation of sending a control commencement command signal to a control device such as a wire logic from the computer thereby commencing the operation.

(c) Set value control worker

This worker is utilized to control the setting of the target load, for example, and involves an operation of setting the value of an analogue sub-loop, for example, by the computer. Thereafter the control is assigned to a sub-loop.

When using these operation workers WKR, the plant engineer is usually required to set only the plant characteristics which are different for different plants and control parameters. Actually, however, there are some workers not belonging to the three types of workers. However, for such workers special machine words are prepared for enabling ready addition or modification of the worker algorithm.

In the foregoing description, the operation control procedure table T corresponding to the block diagram and flow chart utilized in the automatic operating apparatus and the operation worker (WKR) utilized to directly control the plant have been described. The flow of information, the outline as well as the detail of the operation when the automatic operation of the plant is carried out under the control of the computer CPS by using the operation control procedure table T and the operation worker WKR will now be described with reference to FIGS. 10-12.

FIG. 10 is a block diagram showing the flow of information and the outline of the operation in which AQ shows a data input and processing device. A plant parameter representing a plant condition, for example, the turbine speed, is written in a computer CPS through a process input device PI. The output from the process input device PI is periodically applied to the data input processing device AQ where the magnitude of the signal is checked. When the magnitude of the signal becomes larger or smaller than a predetermined level the plant condition discrimination table PMS or the administration table MCS which has previously been stored in a main memory device or an auxiliary memory device AM of the computer CPS is read out to determine the present status of the plant according to the content of the read out table. As a result, the operation table OB is selected and read out to determine what operation should be done at that time. The operation table OB determines one operation, for example what message should be transmitted, or which lamp should be lighted or turned out or what operation should be made. At the same time, a worker table for performing an actual operation is read out thereby performing a direct digital control (DDC) a kick action or a set value control. If there is any condition requiring supervision at that time the supervisory table ALG is read out and a supervisory command signal is given to the data input processing device AQ from the supervisory table ALG.

As described above, all controls are constructed as a hierarchy system and all flow of information is described in tables. As above mentioned, the contents of these tables are stored in the main memory device or the auxiliary memory device AM in the computer CPS in the form of combinations of various patterns. The control system is constructed such that when the plant is brought to a new state according to the read out administration table MCS, operations based on the operation table OB, supervisory table ALG and operating worker WKR are stopped. Consequently, even when the range of the automatic operation of the plant is broadened, the operation of the plant under a given condition would not overlap the operation of the plant under other conditions so that it is possible to simplify the construction of the control system. Where necessary, respective tables can be prepared to strictly define specific plant conditions.

In this manner, this invention enables automatic operation of a plant under the control of an electronic computer, and for a plant having a large capacity it is only necessary to increase the number of tables.

Figure 11A:
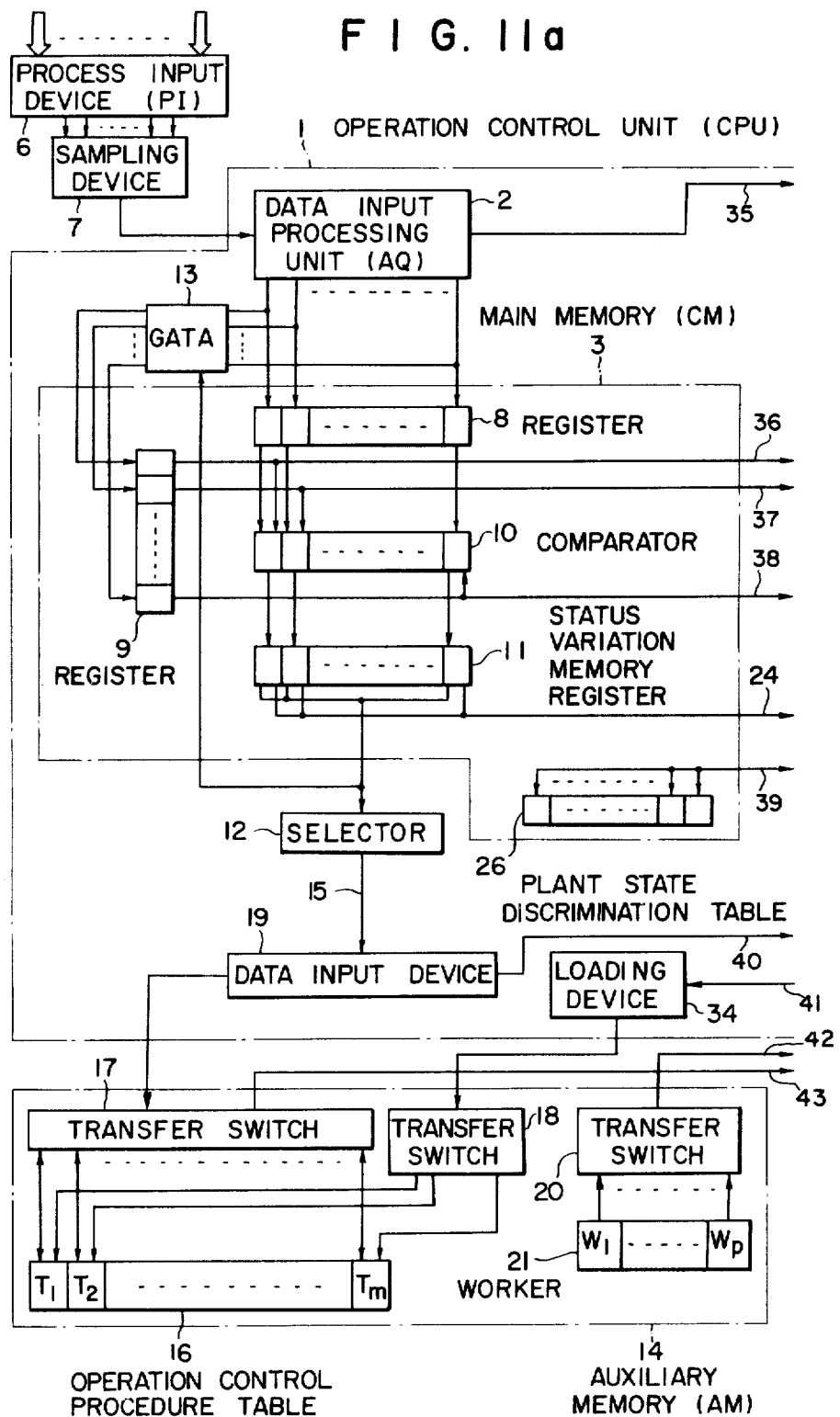
FIGS. 11a and 11b, when combined, show the detail of the block diagram shown in FIG. 4.
Figure 11B:
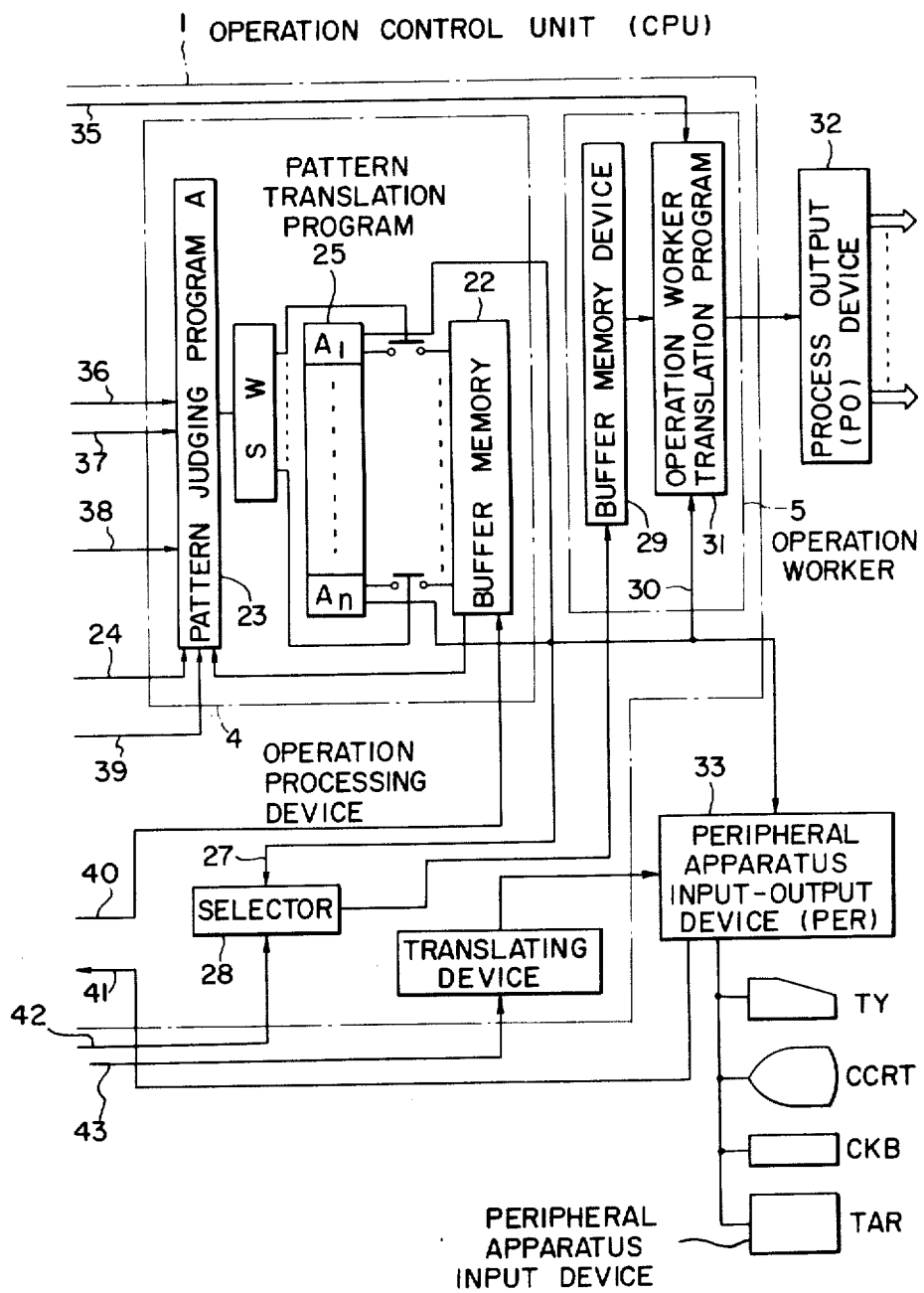

The outline described above will now be described in more detail with reference to FIGS. 11a and 11b which show the detail of the computer system. The operation control unit (CPU) 1 is constituted by a data input processing unit (AQ) 2, a main memory device (CM) 3, an operation processing device 4 and an operation worker 5 and comprises an essential portion of the control system of this invention. Various process input signals from the plant, for example, analogue signals, contact input signals (binary signals) or pulse input signals, respectfully representing the process variables, are converted into digital quantities by a process input device (PI) 6 and these digital quantities are periodically read by the data input processing unit 2 in the operation control device 1 through a sampling device 7. The status (higher or lower than a predetermined level, contact on or off, etc.) of the written signal containing a plurality of bit positions respectively representing the process input signals is stored in respective bit positions of a register 8. On the other hand, the status of the input signals one sampling cycle before is stored in the bit positions of a register 9 process and the states of registers 8 and 9 are compared with each other by a comparator 10. When the compared states do not coincide, that is when at least one process input signal changes, "1" representing the changed process input is set in a respective bit position of a status variation memory register 11. The number of bit positions of the registers 8, 9 and 11 is equal to the number of the process inputs and these registers may be formed as part of the main memory device. When the register 11 is set with at least one "1" signal a gate circuit 13 is enabled to transfer the status signal from the data input processing unit 2 into register 9.

A selector 12 is responsive to the output of the status change memory register 11 to provide a transfer command 15 which selects one or more operation control procedure tables (including plant condition discrimination tables (PMS), administration tables (MCS), operation tables (OB), and supervisory tables (ALG)) stored in the auxiliary memory device 14 in which the status of the process variables which has been found to have changed is described as one of the conditions for operation. When two or more tables are selected, the tables are read out one after another. The PMS, MCS, OB and ALG tables described above are stored in the auxiliary memory device 14 in the form of encoded information, according to the codes of the computer. In FIG. 11a these tables are represented by $T_1, T_2, \ldots T_m$ of tables 16. In response to command 15 produced by selector 12, a data input device 19 applies a transfer request signal to a transfer switch 17 for taking out a desired table among tables $T_1$-$T_m$. The selected table is read out from the auxiliary memory device 14 and then stored in a buffer memory device 22. When the process input signal status changes a pattern judging program 23 is started by a signal produced by the status change memory register 11 to take out the table stored in the buffer memory device 22 for decoding the judgement of the plant state, the operation of the peripheral apparatus, the type of starting of selection of the operation workers which are described in the table, all in accordance with the pattern translation program 25 ($A_1$-$A_n$) which has been described in connection with FIG. 5. The state showing whether the table is being decoded or not, that is whether the operations described in the table are being executed or not is set in a plant state discrimination table 26. This state comprises a binary information, that is "1" or "0". The operation of the pattern judging program is shown by a flow chart shown in FIG. 11c.

The timing of the above described operations is shown by a timing chart in FIG. 17 in which $T_s$ represents a period during which the data input processing unit (AQ) 2 samples and writes a process input. The sampling period is generally set for each process input but may be the same for all process inputs if the processing speed of the data processing input unit permits.

The operation of the pattern judging program 23 will now be described in detail with reference to FIGS. 11a, 11b, 11c, 8a and 8b.

When this pattern judging program 23 is started, it is judges at step 231 (FIG. 11c) whether the status of process inputs signals (or process variables) has changed. This is achieved by comparing the states of the registers 8 and 9, as mentioned above. If no change in the status has occurred, then the program is terminated (step 232). If there has been a change, contents of one of the tables $T_1$-$T_m$ in which the status of the process variables which has been found to have changed is described as one of the conditions for operation are transferred to a buffer memory device 22, and whether of not such transfer is completed is determined at step 233. Execution of subsequent program steps halts until the transfer is completed. Upon completion of the transfer, the contents of the table transferred, e.g., the one shown in FIGS. 8a and 8b are decoded. Such decoding is made by the table shown in FIGS. 8a and 8b. STD, for example, shows "plant state judge" which corresponds to $A_1$. When STD($A_1$) is found in this table, the program control is transferred according to the content of one of $A_1$-$A_n$ to a processing step 238 at which respective processings are performed. When the processing operation is completed, the pattern judging program 23 is switched to select the next sample input to be processed next, and sequentially processes it starting from the first step 231. In this manner, all processing required in response to changes of the process input signal status are performed and thus a series of control operations are performed.

In the case of a worker, the control is effected by $A_n$ for selecting an operation worker (for example, DSC, target=400, rate of change=acceleration).

When an operation worker is selected by a pattern translation program 25, a transfer command 27 is applied to a selector 28 so the sected worker can be read from the auxiliary memory device 14. In response to the command 27 a transfer request is applied to a transfer switch 20 in the auxiliary memory device 14 so an appropriate worker is selected out of a plurality of operation workers and is stored in a buffer memory device 29. Concurrently with the transfer command 27, a start command 30 for starting an operation worker translation program 31 is provided from the pattern translation program 25 and the worker stored in the buffer memory device 29 is executed. Thus, a process variable is inputted through the data input processing device 2 and control over the apparatus of the plant is achieved by the operation worker translation program 31. The control outputs produced by the operation worker translating program 31 are applied to the plant apparatus through a process output device (PO) 32. A suitable message corresponding to the content of the selected table (one of $T_1$ through $T_m$) is sent to a typewriter TY, and cathode ray tube CRT.

As above described, various tables are all stored in the auxiliary memory device 14 and when a process input status has changed, only tables in which the status of that process input is described are read out to the main memory device 3 and other tables not related to that process input are still stored in the auxiliary memory device 14, thus avoiding needless search. Since tables are stored in the auxiliary memory device AM, a translating machine is incorporated into the main memory device CM for translating the content of the read out table. Translated signals are applied to the operation control device CPU for determining a predetermined operation and the result thereof is produced by the process output device PO. The messages to the peripheral apparatus are produced by the peripheral apparatus input-output device PER.

The processing of the automatic operation of the plant effected by the computer CPS according to various tables, namely the operation control procedure table T has been outlined in the above description. Which one of the operation control procedure tables T is to be selected and in what manner the plant is to be controlled will now be described in detail with reference to FIG. 12.

The speed of the turbine TB in the plant PNT is detected by a tachometer generator, shown in FIG. 4. The detected speed is fed to the process input device where the condition of the plant is judged. When the input data shows that the turbine speed is not higher than 50 R.P.M., "0" is set in the register 8. Assume that, upon next sampling, the speed is increased to a value over 50 R.P.M., "1" is set in the register 8. The code "0" which reflects the status of the turbine speed at the time of the preceding sampling is stored in the register 9. The contents of the registers 8 and 9 will be found to be different by the comparator 10, and hence, as described before, a code "1" indicating the occurrence of a change in the status of the turbine speed T264 is stored in the register 11. When "1" is set in the register 11, the gate 13 is enabled and the status signal from the data input processing unit 2 is transferred to the register 9, and hence the content of the register 9 is changed from "0" to "1". Thus, the register stores the signal indicating the latest status. The selector 11 selects a table PMS 001 "turning clutch disengage" in which the status of the turbine speed T264 is described as one of the conditions. Thereafter, judgement is made according to the logical equation described in the table PMS001, when T300 "turning clutch disengage" is satisfied and when T300 "turbine master reset" is satisfied, an answer ANS is changed. The state of the PMS is changed from a non-satisfying state "0" to a satisfying state "1". The state is stored in the table 26. The change of the state of PMS001 teads to selection of MCS001 "turning clutch disengage" table PMS001 of the administration table MCS, one example thereof being shown in FIG. 7. When the MCS001 table is selected the other plant conditions at that time is given by the information table, i.e., register 9. Thus, when the conditions such as T264 and T301 (turbine speed up push botton ON) are satisfied by vertical columns, the condition described beneath the vertical columns, in this case OBOOOO will be selected. This condition OBOOOO corresponds to the operating table OB (one example thereof being shown in FIG. 8) whereby this table is read out. Where the plant condition at that time is such that its previous condition, that is PANS (which means that the mismatch temperature is higher than 111° C. but less than 167° C.) is satisfied, and that the condition CANS (turning clutch has been disengaged and turbine speed is higher than 400 RPM) is not yet satisfied, the SMR and WKR operating routines are processed. More particularly, a message "turbine target speed 400 RPM" is transmitted to SMR through the peripheral apparatus input-output device PER, and for WKR a DSC worker table is selected whereby a command signal "turbine speed 400 RPM ACCEL" is applied to the plant. The decoding of the tables and the control operations are performed by the operation processing device 4. A worker (DSC, in the example) assigned by the operation processing device 4 is transferred to the buffer memory 29 shown in FIG. 11b and control by the worker 5 over the rotational speed of the turbine is commenced. To control the turbine speed up, DSC is applied with a feedback signal from the data input processing device AQ which is operated by the operation control device CPU. The result of this operation is given to the plant apparatus to act as a control signal thus controlling the acceleration of the turbine. While the foregoing description relates to the control of the acceleration of the turbine, respective tables of the running operation procedure tables T are successively selected and read out from the data input processing device AQ according to respective controls for performing respective automatic running controls.

In the foregoing description, the automatic running of a plant under the control of a computer CPS based on the running operation procedure table T has been described. Conversion of the content of the operation control procedure table T into machine words will now be described with reference to FIG. 13.

As has been described hereinabove, each running operation procedure table T is prepared by describing digits of the orders of magnitude that can be written into the computer CPS, symbols and characters. The order of "Ys" which indicates the vertical columns of the table determines the order of respective cards CD. Starting from Y=1 respective cards CD are perforated by a puncher PCH in accordance with the content of the operation control procedure table T. In this manner, several or several tens of cards CD are prepared from one procedure table T, and these cards are grouped into a card block CDB. Thus, one card block CDB contains the same contents as one operation control procedure table T, and no alternation of the content is made except the punching of cards CD. The card block CDB is then applied to host computer CPUH so as to convert its content into machine words in terms of binary codes, which are recorded on a card or magnetic tape TA, such card and tape being called an "object". The object is constructed such that it can be directly written in the computer CPS just in the same manner as ordinary programs. The content of the object written into the computer CPS is stored in its auxiliary memory device AM.

The operation which follows the operation of the magnetic tape TA will now be described with reference to FIG. 11a.

The magnetic tape TA is set in a peripheral apparatus input device TAR which is controlled by the peripheral apparatus input-output device (PER) 33 for transferring the content of the magnetic tape TA to a loading device 34 so as to discriminate the type of the table 16 designated by the contents of the magnetic tape TA and to write the content in a prescribed table (one of $T_l$-$T_m$) by switching the transfer switch 18. Thus, when the table is firstly discriminated information is set therein, whereas at the time of modification, its content is changed. In this manner, the magnetic tape TA prepared by the host computer is automatically stored in a predetermined position in the auxiliary memory device 14, in the form of machine words and then utilized for the automatic operation of the plant.

In this manner, the contents of various running operation procedure tables T are memorized in the computer CPS thereby enabling the automatic operation of the plant according to predetermined procedures.

Since the control system of this invention utilizes a digital electronic computer system CPS, the modification and alternation of the system can be made easier than prior art systems. More particularly, in the prior art systems, modification of the automatic operating system has been impossible unless modifying the program by extremely troublesome work. Since most of these modifications and alternations are made for the purpose of eliminating problems which are found as the result of the actual running of the plant, such modifications and alternations can be made very readily, which is the outstanding feature of this invention. According to this invention, various running procedures of the plant are described in various operation control procedure tables T and since these procedures are processed by the computer in accordance with combinations of various patterns, it is possible to modify the automatic operating system without changing the format of the running operation procedure table T.

A compiler utilized to modify the control system is constructed to change the information which is stored in source code.

According to this invention, since the informations are stored by using suitable machine words for the operation control procedure table T for each running pattern of the plant, modification of the system or the modification of the running operation procedure table T is performed by the following two steps.

(1) Converting the running pattern to the procedure table format and displaying the procedure table format on the CRT screen.

(2) Converting the procedure table format to the running pattern.

Figure 14:
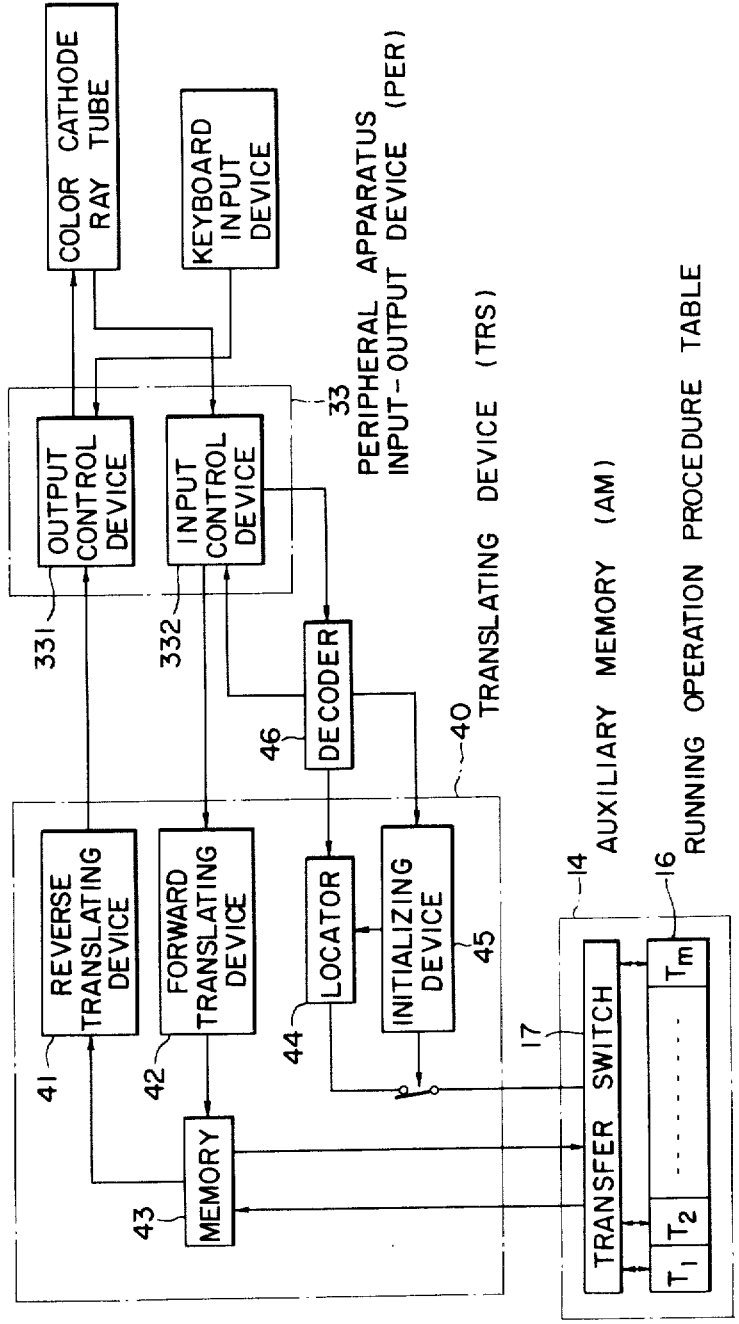
FIG. 14 is a block diagram showing the construction of the apparatus utilized to modify the operation control procedure table.

The detail of such modification of the system will now be described with reference to FIG. 14.

As shown the apparatus utilized for the modification are:

(1) A display device such as color cathode ray tube CCRT (2) A keyboard input device CKB for the display device (3) A translating device (TRS) 40, the auxiliary memory device (AM) 14 and the peripheral apparatus input-output device (PER) 33.

The modification is made according to the following procedure.

A running operation procedure table 16 ($T_l$-$T_m$) is stored in the auxiliary memory device 14 in terms of machine words. An operator designates a table to be modified (one of $T_l$-$T_m$) by using a character or a word of the keyboard input device CKB. The designated character or word is displayed on the color cathode ray tube CCRT through an output control device 331. The designated character or word is read into an input control device 332 of the peripheral apparatus input-output device (PER) 33 to judge the type of designated table. In response to this information a decoder 46 gives the location of the auxiliary memory device 14 to a locator 44. In accordance with this location, the transfer switch 17 transfers the designated table among a plurality of tables 16 to a memory device 43. The table transferred to the memory device 43 is translated by reverse translating device 41 into forms shown in FIGS. 6 through 9 and then displayed on the color cathode ray tube CCRT through the output control device 331. The portion of the displayed table to be modified is rewritten with the keyboard input device CKB and the modified table is stored in the memory device 43 through a forward translating device 42 which converts the tables into the machine words regarding an operation pattern. The content of the memory device 43 is transferred to and stored in a location of the auxiliary memory device 14 designated by the locator 44. In this manner, the operator writes into the cathode ray tube the portion to be modified and the codes to be modified in the displayed procedure table format with the keyboard input device CKB. Such modification can be made by operating the keyboard. Upon completion of the modification, the keyboard input device CKB produces a signal showing that the modification has been completed. This signal is transmitted to decoder 46 via input control device 332 and the output of the decoder clears the locator 44 and resets the transfer switch 17 through an initializing device 45. As shown in FIG. 11a, the new procedure table displayed on the cathode ray tube in a manner as above described is written into a translating device (TRS) 40 in the operation control unit (CPU) 1 so as to change from the procedure format to the operation pattern as has been described in item (2). Upon completion of the change, a patternized procedure table is stored in a predetermined position ($T_1$-$T_m$) of the auxiliary memory device 14.

Where the display device cannot record the display, a typewriter may be used.

The above described procedure of modifying the control system has the following advantages.

(1) It is more compact than a conventional compiler and it can be incorporated into an electronic computer in an on-line process control of a plant.

(2) At the time of modification, the operator can make modification without the knowledge of the operation command codes of the computer.

(3) It is possible to modify the table displayed on the screen of the color cathode ray tube display device (CCRT) by using the same format as the description of the operation control procedure tables T shown in FIGS. 6 to 9.

(4) The purpose of the modification can be accomplished by using standard component parts even when the scale of the automatic running system is enlarged.

(5) Since the modification apparatus can be made up of standard component elements it can be used for the automatic running system of any plant.

While the invention has been described in terms of a steam electric power generating plant, it should be understood that the invention is also applicable to any other plant so long as the running procedure can be judged from the operating state of the plant. For example, the invention is also applicable to atomic power electric generating plants, chemical plants and other plants where process control is adopted, especially to continuous control sytems and supervision of factories.

Moreover, the type of the procedure tables is not limited to that of the embodiment. For example, where the scale of the plant is small so that its operation procedure is simple, only the operation table OB is sufficient and it is not necessary to use any administration table MCS. It is advantageous to use a minimum number of types of the tables.

Figure 15B:
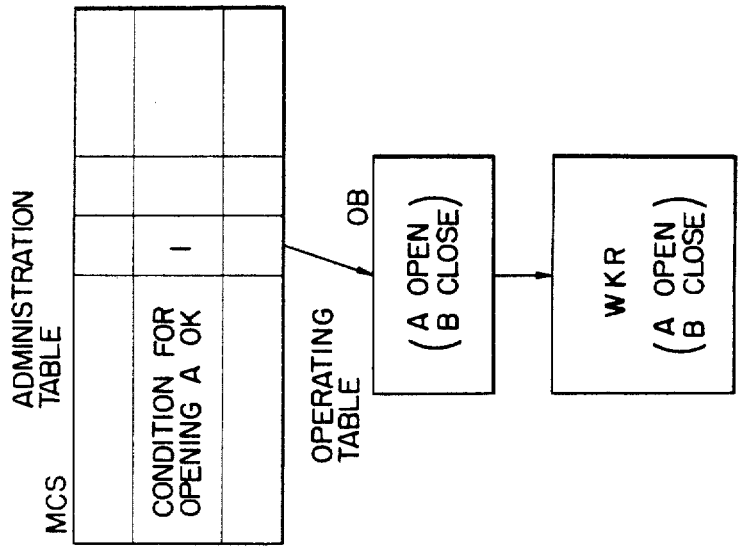
FIGS. 15a, 15b and 16 are block diagrams showing operation control procedure tables containing different descriptions.
Figure 15A:
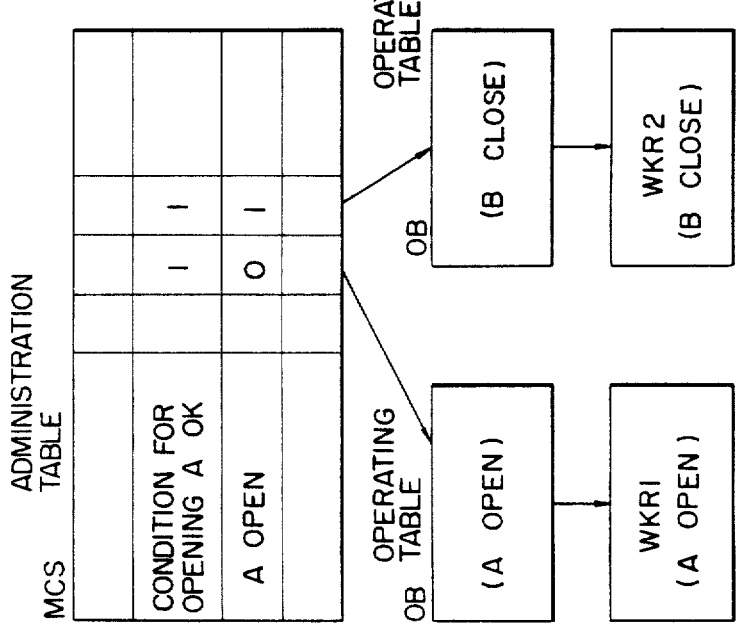

Considering now a series of operations in which a control valve V1 is closed, to a predetermined extent, and then a control valve V2 is fully opened, two types of the method of describing tables as shown in FIGS. 15a and 15b can be used.

Thus, according to the method shown in FIG. 15a, the operating table is divided into two parts, the operation worker is also divided into WKR1 and WKR2, and two timings are used for the administration table MCS. According to the method shown in FIG. 15b, only a single operating table OB is used and the operation worker WKR is used for sequentially effecting "Opening of V1" and "Closing of V2".

Figure 16:
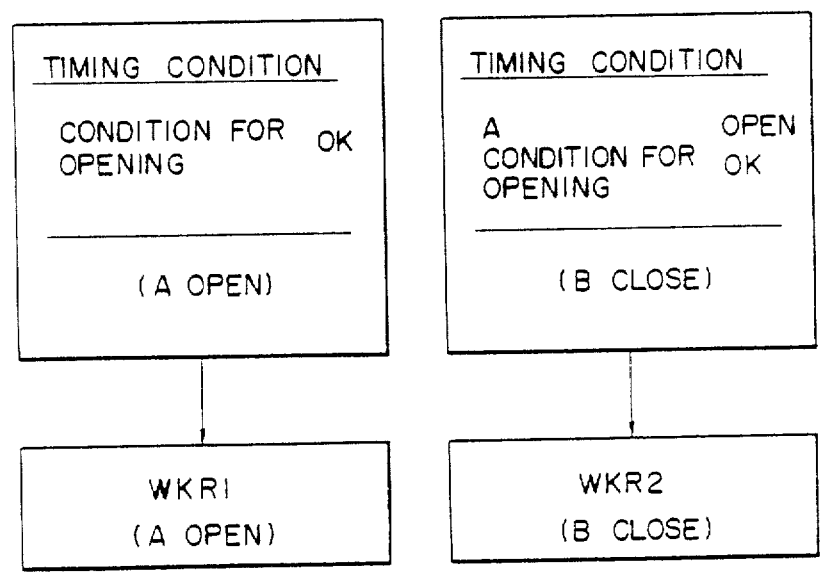

Alternatively, the conditions of the administration table MCS shown in FIG. 15a may be used as the timing conditions of respective operation tables OB, thus eliminating the administration table. FIG. 16 shows this modified method. The type and classification of the running operation procedure tables T are not immutable and may be modified variously to satisfy the requirement of the plant.

Even when a computer system is made up of a plurality of component elements if they have the same or similar characteristics it is possible to simplify the control system.

Since the control system of this invention is a perfect event orientation system, it is extremely advantageous for a sequence monitoring system (a system for providing an operating guidance to the operator). The invention can readily be applied to such system by merely substituting the operation worker for the message.

In summary, the automatic running system of this invention has the following advantages.

(1) By representing various running procedures of a plant by tables which can be readily understood at a glance and by strictly describing the tables it is possible to convert the contents of the tables into machine words that can be processed by an electronic computer. In other words, it is only necessary to prepare one or a set of tables so that it is possible to eliminate the troublesome job of preparing block diagrams, flow charts and encoding which have been necessary for the prior art method in order to control the detail of the running procedures of the plant. Accordingly, it is possible to greatly reduce the period between the preparation of the specification and the production of the control system.

(2) Since it is not necessary to use any flow chart, the contents per se of the table can be stored in the memory device of the computer independently of the device for reading and understanding the table so that if the memory device, process input device, process output device, etc. have ample capacities, it is possible to readily make additions, modifications and deletions after the control system has been manufactured and installed. For this reason, errors of the control system caused by the errors of the specification and range of automatic operation can readily be corrected.

(3) It is possible to follow up at high fidelities any change in the operating state of the plant although it is difficult to follow up such change with a conventional system in which the control operations are made sequentially. For example, where the state of the plant returns to the state of "turning clutch engage" from the state of "turning clutch disengage" for some reason, the control system of this invention can automatically resume the original state of "turning clutch engage". In other words, where a portion of the running state of the plant becomes abnormal, it is possible to continue the control operation except those related to the faulty operation and whenever such fault is removed, the control system can resume an original state. Further, in the prior art tables such as block diagrams or flow charts in which the contents are expressed sequentially or described according to "Fill-in Blank System", the control of an emergency or fault of the plant is limited to an expression specified by a definite rule or to a sequential expression whereas according to the table system of this invention it is possible to independently handle a plurality of operations. Moreover, as the description of the table comprises a combination of logical equations it is possible to strictly define the abnormal condition of the plant, thereby enabling continuous running of the plant in case of an emergency.

(4) Since the processing of the informations necessary for running the plant and effected by an computer is limited to tables related to the state of the plant and since only the data input processing device AC of the computer is constantly watching the state of the plant, it is not necessary to exchange the table unless the state of the plant varies thereby improving the capability of processing of the computer.

Figure 2:
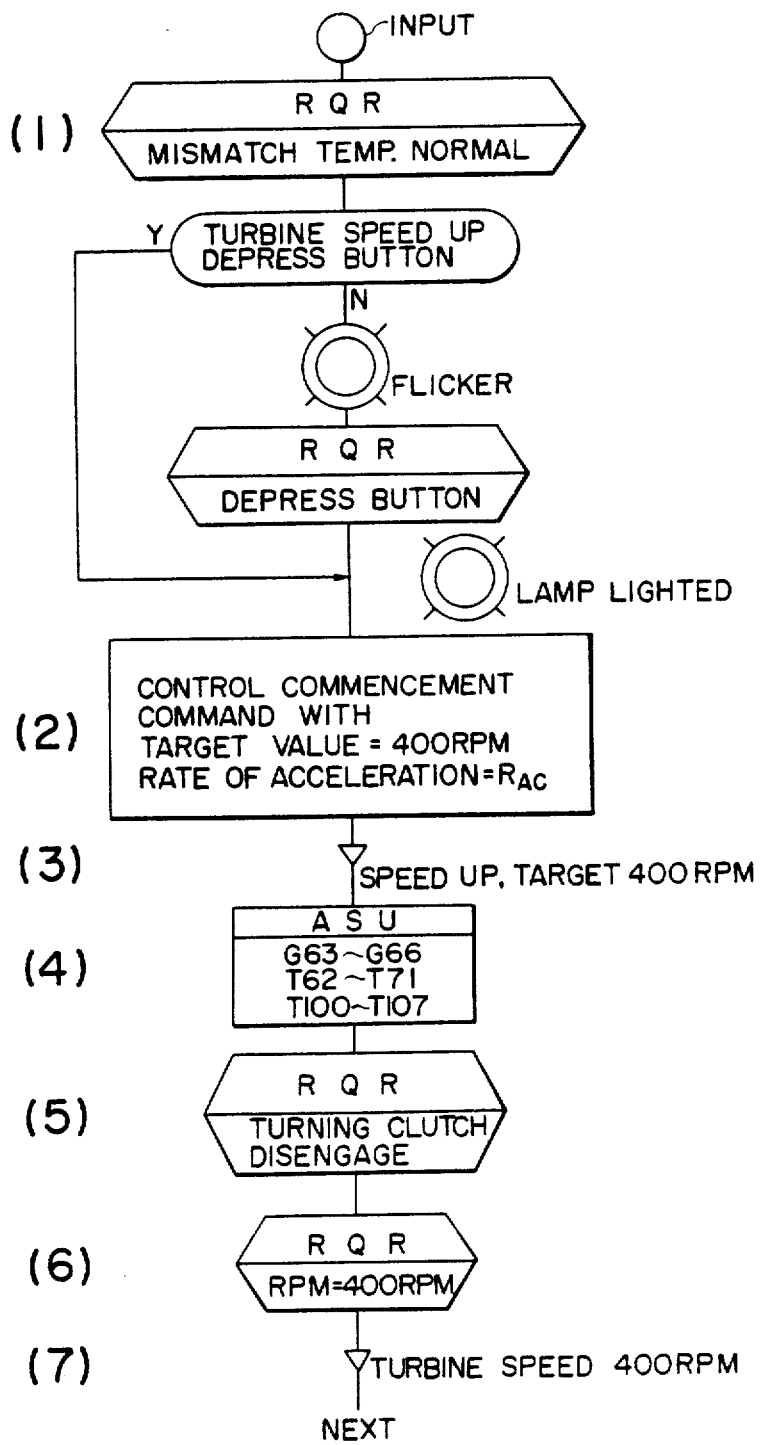
FIG. 2 shows one example of a block diagram utilized to start and accelerate a steam turbine.

In contrast, according to the prior art system in which individual running control of the plant is constructed as an individual program it is required to perform processings of the number equal to that of the control loops, which limits the number of loops that can be processed by a computer of a given capacity. For instance, the control of the plant may be divided into a plurality of loops for control of a turbine, control of draft of a boiler, control of a burner and the like. Procedure for control of each loop is defined by a program according to a flowchart similar to the one shown in FIG. 2. As a result, a plurality of programs are concurrently in progress at any moment. But as the number of programs the computer can handle concurrently is limited, it is necessary to place a limitation on the number of loops in dividing the control of the plant into plural loops. It should also be noted that forming a program for each loop will necessitate incorporating, in advance, a procedure for starting the control procedure from a middle of the loop. When an operation a procedure for which is not contained in the program is to be added, the entire program has to be re-formed.

(5) Where a computer is applied to the process control of a plant, whether the control is effected by using tables or programs of any type, where the control of the plant involves unknown characteristics it is essential to make some modification or addition of the tables or programs. However, according to this invention since the tables and the apparatus for reading and understanding the same are constructed as independent units the modification of the control capability can readily and accurately be made by mere modification of the tables. Since no complier of large capacity is needed for this purpose, it is possible to apply the invention to the control of any plant of small scale. Since the method of describing the tables is generalized, modification thereof is easy for any plant.

As above described since the method and system of this invention can eliminate various defects of the prior art method and system the invention cannot only provide efficient automatic control of various plants by a computer but also widen the field of application.

What is claimed is:

1. A control system for controlling a plant wherein various operations are performed if conditions calling for a particular operation are satisfied, said control system comprising:

a process input device connected to receive process input signals from said plant, said process input signals respectively representing the process variables of the plant, a data input processing device connected to said process input device for periodically reading the process input signals and for producing status signals respectively representing the status of the process variables, an auxiliary memory device for storing operation control procedure tables of a prescribed format, each of said operation control procedure tables containing information as to whether or not the plant is in a state calling for a certain combination of operations to be performed, in relation to the plant operation conditions required for recognition of said state, said information including a required status of certain of the process variables and further describing a combination of operations to be performed when the plant is in said state, said combination of operations including a combination of process controlling operations, a combination of process supervision operations and a combination of information display operations, said auxiliary memory device further storing worker programs, each associated with each combination of process controlling operations and used for performing the associated process controlling operations to produce a control signal for controlling the plant, a first register means connected to said data input processing device for periodically storing one of said status signals during a first sampling period, a second register means connected through a gate means to said data input processing device for receiving, when said gate means is enabled, said one status signal previously stored in said first register means in a second earlier sampling period, comparison means for comparing the contents of said first and second register means, status change memory means responsive to said comparison means for producing an output signal representing those process variables having their status changed between said second and first sampling periods when said comparison means indicates the contents of said first and second register means do not coincide, said gate means being enabled when said status change memory means produces said output signal, a first selector responsive to the output signal of said status change memory means for selecting those operation control procedure tables stored in said auxiliary memory device in which the status of the process variable which has been found to have changed is described as one of the conditions for recognition of said operation, an operation processing device for processing the selected operation control procedure tables in turn, and comprising:
- a pattern judging program for judging whether or not the conditions for recognition of a state calling for a certain combination of operations to be performed are satisfied, and if they are satisfied, recognizing that the plant is in said state, and
- a pattern translating program for determining the combination of operations to be performed when the process is in said state, said pattern translating program producing, when the operation to be performed is a combination of supervision operations or a combination of display operations, a signal instructing an operation for supervision or display, and producing when the combination of operations to be performed is a controlling operation, a start command and a transfer command for selecting the worker program associated with the controlling operation,
- a second selector responsive to said transfer command for selecting the worker program associated with the controlling operation,
- means started by said start command for reading and translating the worker program selected by said second selector and producing an instruction for control of said plant, and
- a process output device responsive to the instruction from said instruction means for producing a signal for controlling said plant.

2. The control system according to claim 1 further comprising a peripheral apparatus input-output device, a visual display device, means in said operation processing device for formulating a visual message in a format for display on said display device in accordance with the content of a selected operation control procedure table and means to send said visual message to said visual display device through said peripheral apparatus input-output device to obtain visual information from said selected operation control procedure table.

3. The control apparatus according to claim 2 wherein said visual display device comprises a cathode ray tube and a printer.

4. The control system according to claim 1 which further comprises a translator for translating a said selected table from an alphanumeric format as visual information for an operator to a binary code format for the execution in said control system or from binary code format to an alphanumeric format for assisting an operator in modifying a selected table, said translator including:
- a visual display device,
- a keyboard input device for designating one of said operation control procedure tables stored in said auxiliary memory device and causing it to be displayed on said display device and for modifying at least a portion of said one of the tables,
- second means for translating the content of said designated operation control procedure table into an operator readable format,
- means for displaying said operator readable format of said designated table on said visual display device, said keyboard input device being capable of modifying at least a portion of the translated content of said designated table displayed on said visual display device, and
- means for modifying the content of said designated operation control procedure table in accordance with said modified portion of the translated content of said designated table.

5. In a generating plant including a steam generator, a prime mover operated by the steam generated by said steam generator, an electric generator driven by said prime mover, and auxiliary apparatus necessary to operate said steam generator, said prime mover and said electric generator, wherein the operation timing, and the operating conditions before and after predetermined operations of said machines and apparatus are checked in response to signals representing the temperature, pressure and flow rate of said steam, the temperature of the prime mover and the steam generator, the voltage and current of said electric generator, the speed of said prime mover or the opening of a valve for controlling said steam, and said checked timing and operating conditions are compared with prescribed values contained in a predetermined program for producing control signals for operating said machines and apparatus, a method for controlling the operation of said generating plant by means of an electronic digital computer wherein each of various operations is performed if conditions for the particular operation are satisfied, said method comprising the steps of:
- obtaining process input signals from said plant, said process input signals respectively representing the process variables of the plant,
- periodically reading the process input signals and determining the status of the process variables of the plant to produce status signals respectively representing the status of the process variables,
- preparing an auxiliary memory device for storing operation control procedure tables of a prescribed format, each of said operation control procedure tables containing information as to whether or not the plant is operating in a state calling for a certain combination of operations to be performed in relation to the plant operating conditions required for recognition of said state, said information including a required status of certain of the process variables and further describing a combination of operations to be performed when the plant is in said state, said combination of operations including a combination of process controlling operations, a combination of process supervision operations and a combination of information display operations, said auxiliary memory device further storing worker programs, each associated with each of the combinations of process controlling operations and used for performing the associated process controlling operation to produce a control signal for controlling the plant,
- detecting a change in the status of each process variable,
- selecting one or more operation control procedure tables stored in said auxiliary memory device in which the status of the process variable which has been found to have changed is described as one of the conditions for operation,
- determining whether or not the conditions for recognition of a certain state calling for a certain combination of operations to be performed are satisfied, and if they are found to be satisfied, determining that the plant is operating in said state,
- determining the combination of operations to be performed when the plant is operating in said state, for producing, when the combination of operations to be performed relates to process supervision or information display, a signal for supervision or display, and producing, when the combination of operations to be performed relates to a process controlling operation, a start command and a transfer command for selecting a worker program associated with the controlling operation, selecting the worker program associated with the process controlling operation in accordance with said transfer command, reading, responsive to said start command, and translating the selected worker program to produce an instruction for control of the plant, and producing, responsive to the instruction from the worker operation, a signal for control of the plant.

6. The method according to claim 5, further comprising the steps of displaying a selected table on a visual display device and changing the contents of the selected table in said memory device.

* * * * *